United States Patent
Wang

(10) Patent No.: US 11,924,874 B2
(45) Date of Patent: Mar. 5, 2024

(54) ENHANCED CHANNEL OCCUPANCY SHARING MECHANISM FOR RANDOM ACCESS AND PUCCH IN UNLICENSED SPECTRUM

(71) Applicant: Telefonaktiebolaget LM Ericsson (PUBL), Stockholm (SE)

(72) Inventor: Min Wang, Luleå (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 448 days.

(21) Appl. No.: 17/283,635

(22) PCT Filed: Sep. 23, 2019

(86) PCT No.: PCT/SE2019/050904
§ 371 (c)(1),
(2) Date: Apr. 8, 2021

(87) PCT Pub. No.: WO2020/076211
PCT Pub. Date: Apr. 16, 2020

(65) Prior Publication Data
US 2021/0392680 A1    Dec. 16, 2021

Related U.S. Application Data

(60) Provisional application No. 62/743,057, filed on Oct. 9, 2018.

(51) Int. Cl.
*H04W 74/08* (2009.01)
*H04W 16/14* (2009.01)
(52) U.S. Cl.
CPC ....... *H04W 74/0808* (2013.01); *H04W 16/14* (2013.01)

(58) Field of Classification Search
CPC . H04W 74/00; H04W 74/08; H04W 74/0816; H04W 74/0866; H04W 16/28; H04W 71/1268; H04W 74/006
See application file for complete search history.

(56) References Cited

U.S. PATENT DOCUMENTS

2017/0290048 A1* 10/2017 Amuru .............. H04W 72/0446
2018/0343639 A1* 11/2018 Zheng .................. H04W 24/10
2019/0349991 A1* 11/2019 Mukherjee ............ H04L 5/1469

FOREIGN PATENT DOCUMENTS

EP    3 407 662 A1    11/2018
WO   2017 125049 A1   7/2017

OTHER PUBLICATIONS

3GPP TS 36.213 v15.1.0; Technical Specification; 3rd Generation Partnership Project; Technical Specification Group Radio Access Network; Evolved Universal Terrestrial Radio Access (E-UTRA); Physical layer procedures (Release 15)—Mar. 2018.

(Continued)

*Primary Examiner* — Iqbal Zaidi
(74) *Attorney, Agent, or Firm* — Christopher & Weisberg, P.A.

(57) ABSTRACT

A method performed by a wireless device (110) includes, for a first transmission of a procedure, selecting a first channel sensing procedure for determining availability of a channel in the unlicensed spectrum. Based on the first channel sensing procedure, it is determined that the channel in the unlicensed spectrum is available. In response to determining that the channel in the unlicensed spectrum is available, a maximum channel occupancy time, MCOT, duration associated with the first channel sensing procedure is determined. The MCOT duration is an amount of time in which the wireless device and a network node are allowed to transmit on the channel in the unlicensed spectrum for the procedure. The wireless device transmits the first transmis- (Continued)

sion during the MCOT duration and receives a second transmission from a network node (160). The second transmission includes a first listen-before-talk, LBT, scheme for a third transmission associated with the procedure.

21 Claims, 19 Drawing Sheets

(56) References Cited

OTHER PUBLICATIONS

3GPP TS 36.321 V15.0.0; Technical Specification; 3rd Generation Partnership Project; Technical Specification Group Radio Access Network; Evolved Universal Terrestrial Radio Access (E-UTRA); Medium Access Control (MAC) protocol specification (Release 15)—Dec. 2017.
3GPP TS 38.321 v15.0.0; Technical Specification; 3rd Generation Partnership Project; Technical Specification Group Radio Access Network; NR; Medium Access Control (MAC) protocol specification (Release 15)—Dec. 2017.
PCT International Preliminary Report on Patentability issued for International application No. PCT/SE2019/050904—dated Sep. 18, 2020.
3GPP TSG-RAN WG1 Meeting #94bis; Chengdu, China; Title: Channel access procedures for NR-U (R1-1810860)—Oct. 8-12, 2018.
3GPP TSG-RAN WG2 Meeting #103bis; Chengu, China; Source: vivo; Title: Enhance RACH with Additional Transmission Opportunities (R2-1814262)—Oct. 8-12, 2018.
PCT International Search Report issued for International application No. PCT/SE2019/050904—dated Dec. 6, 2019.
PCT Written Opinion of the International Searching Authority issued for International application No. PCT/SE2019/050904—dated Dec. 6, 2019.

\* cited by examiner

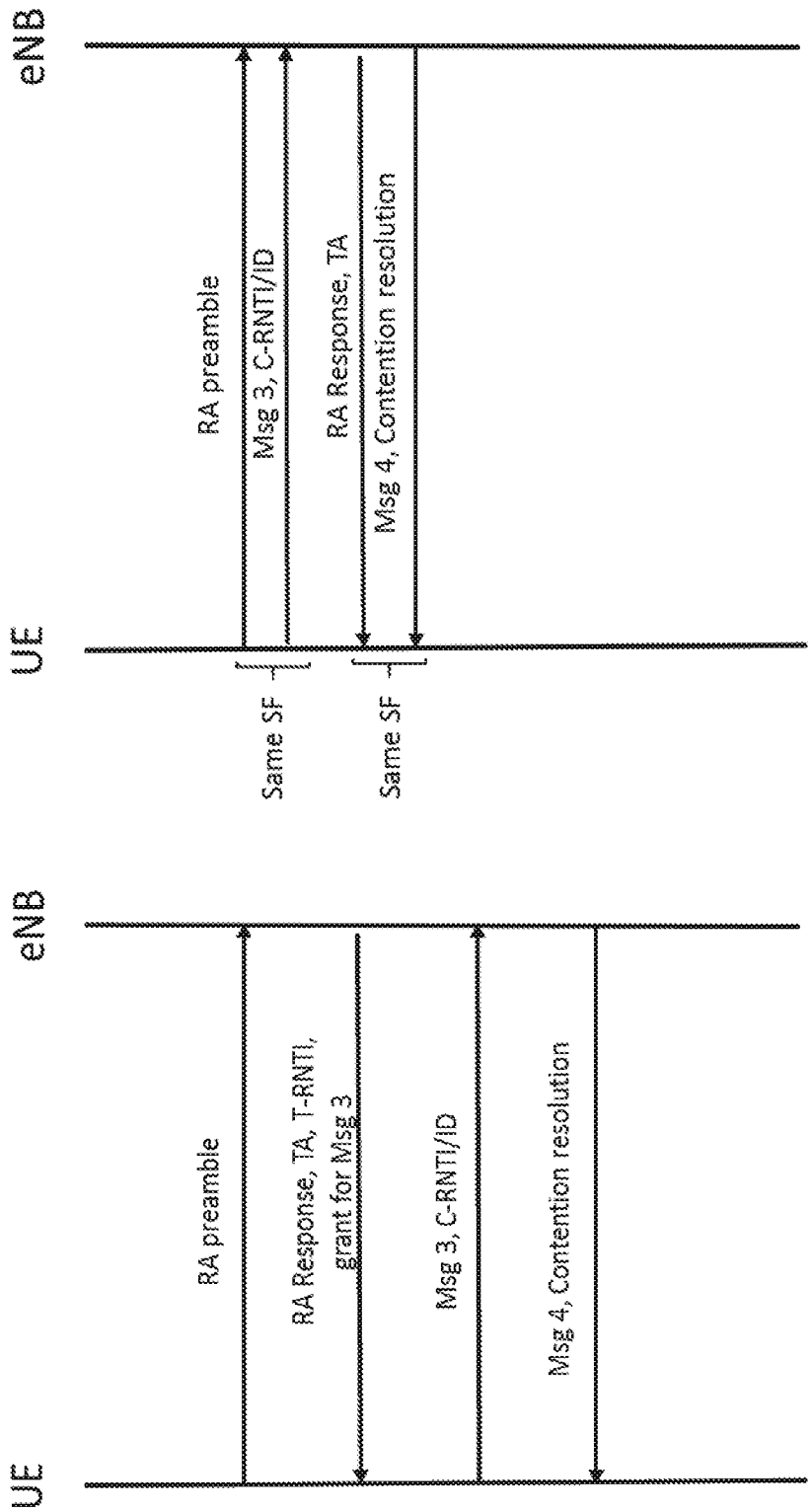

ENHANCED CHANNEL OCCUPANCY SHARING MECHANISM FOR RANDOM ACCESS AND PUCCH IN UNLICENSED SPECTRUM

PRIORITY

This nonprovisional application is a U.S. National Stage Filing under 35 U.S.C. § 371 of International Patent Application Serial No. PCT/SE2019/050904 filed Sep. 23, 2019 and entitled "ENHANCED CHANNEL OCCUPANCY SHARING MECHANISM FOR RANDOM ACCESS AND PUCCH IN UNLICENSED SPECTRUM" which claims priority to U.S. Provisional Patent Application No. 62/743, 057 filed Oct. 9, 2018 both of which are hereby incorporated by reference in their entirety.

TECHNICAL FIELD

The present disclosure relates, in general, to wireless communications and, more particularly, systems and methods for enhanced channel occupancy sharing for Random Access (RA) and Physical Uplink Control Channel (PUCCH) in the unlicensed spectrum.

BACKGROUND

Next generation systems are expected to support a wide range of use cases with varying requirements ranging from fully mobile devices to stationary Internet of Things (IoT) or fixed wireless broadband devices. The traffic pattern associated with many use cases is expected to consist of short or long bursts of data traffic with varying length of waiting period in between (here called inactive state). In NR, both license-assisted access (LAA) and standalone unlicensed operation are to be supported in 3GPP. Thus, the procedure of physical random access channel (PRACH) transmission and/or scheduling request (SR) transmission in unlicensed spectrum shall be investigated in 3GPP. In the following, channel sensing scheme and/or procedure based on listen-before-talk (LBT), random access procedure and LBT scheme/procedure for PRACH and shortened physical uplink control channel (sPUCCH) are introduced as a basis to address the solutions.

In order to tackle ever increasing data demand, NR is considering using both the licensed and unlicensed spectrums. The standardization work for the licensed spectrum in 3GPP Release 15 is still on-going and will be finished in 2018. Therefore, 3GPP has defined and approved a study item on NR-based Access to Unlicensed Spectrum at RAN-77. Compared to the LTE LAA, NR-U also needs to support direct connectivity (DC) and standalone scenarios, where the medium access control (MAC) procedures including RACH and scheduling procedure on the unlicensed spectrum are subject to the LBT failures, while there is no such restriction in LTE LAA, since there was licensed spectrum in LAA scenario so the RACH and scheduling related signaling can be transmitted on the licensed spectrum instead of unlicensed spectrum.

The Radio Resource Management (RRM) procedures in NR-U would be generally rather similar to those in LAA, since NR-U is aiming to reuse LAA/eLAA/feLAA technologies as much as possible to handle the coexistence between NR-U and other legacy radio access technologies (RATs). Channel access/selection for LAA was one of important aspects for co-existence with other RATs such as Wi-Fi. For instance, LAA has aimed to use carriers that are congested with Wi-Fi. Therefore, RRM measurements are critical for congestion avoidance purposes.

In the licensed spectrum, a user equipment (UE) measures Reference Signal Received Power (RSRP), and Reference Signal Received Quality (RSRQ) of the downlink radio channel, and provides the measurement reports to its serving eNB/gNB. However, the measurement reports don't reflect the interference strength on the carrier. Another metric, Received Signal Strength Indicator (RSSI), can serve for such purpose. On the eNB/gNB side, it is possible to derive RSSI based on the received RSRP and RSRQ reports; however, this requires that they must be available. Due to the LBT failure, some reports in terms of RSRP or RSRP may be blocked (due to that the reference signal transmission (DRS) is blocked in the downlink or the measurement report is blocked in the uplink). Thus, the measurements in terms of RSSI are very useful. The RSSI measurements, together with the time information concerning when and how long that UEs have made the measurements, can assist the gNB/eNB to detect a hidden node. Additionally, the gNB/eNB can measure the load situation of the carrier, which is useful for the network for prioritizing some channels for load balance and channel access failure avoidance purposes.

LTE LAA has been defined to support measurements of averaged RSSI and channel occupancy for measurement reports. The channel occupancy is defined as percentage of time that RSSI was measured above a configured threshold. For this purpose, a RSSI measurement timing configuration (RMTC) includes a measurement duration (e.g. 1-5 ms) and a period between measurements (e.g. {40, 80, 160, 320, 640} ms).

LBT is designed for unlicensed spectrum co-existence with other RATs. In this mechanism, a radio device applies a clear channel assessment (CCA) check before any transmission. The transmitter involves energy detection (ED) over a time period compared to a certain threshold (ED threshold) in order to determine if a channel is idle. In case the channel is determined to be occupied, the transmitter performs a random back-off within a contention window before a next CCA attempt. In order to protect the acknowledgement (ACK) transmissions, the transmitter must defer a period after each busy CCA slot prior to resuming back-off. As soon as the transmitter has grasped access to a channel, the transmitter is only allowed to perform transmission up to a maximum time duration (namely, the maximum channel occupancy time (MCOT)). For QoS differentiation, a channel access priority based on the service type has been defined. For example, as defined by 3GPP RAN1 #80, there are four LBT priority classes/categories for differentiation of contention window sizes (CWS) and MCOT between services.

Category 1: No LBT
Category 2: LBT without random back-off
Category 3: LBT with random back-off with fixed size of contention window
Category 4: LBT with random back-off with variable size of contention window Channel access procedure for MuLteFire will now be described. In Section 14 in 3GPP TS 36.321-f00, the LBT procedures for PRACH and sPUCCH are defined:

The UE shall use Type 1 channel access procedure to transmit a transmission including SR at subframe n which is configured by higher layer signaling, if a UE does not detect PDCCH with DCI CRC scrambled by CC-RNTI in subframe n−1. UL channel access priority class p=1 may be used for SR transmissions.

For MF, a UE shall transmit a transmission including MF-ePUCCH on a channel on which MF transmission(s) are performed following the same channel access procedure defined for PUSCH transmission.

For MF cells, UE may transmit a transmission including MF-sPUCCH on a channel. A UE may perform type 2 channel access procedure if mf-sPUCCHLbtis is enabled by higher layer signaling. A UE may transmit without performing channel sensing if mf-sPUCCH-Lbt is not enabled by higher layer signaling. MF eNB ensures the MF-sPUCCH transmission immediately follows the preceding DL transmission within 16 us if mf-sPUCCH-Lbt is set to be false.

For MF cells, a UE may transmit a transmission including PRACH on a channel on which MF transmission(s) are performed using type 2 channel access procedure if the mf-PRACH-Lbt is set to be true by higher layer signaling. A UE may transmit a transmission including PRACH on a channel without performing channel sensing, if mf-PRACH-Lbt is set to be false by higher layer signaling.

For MF cells, when mf-PRACH-Lbt is set to true, and mf-sPUCCH-Lbt is set to false, UE should perform a type 2 channel access procedure on subframe n which is configured by higher layer signaling for PRACH transmission.

RACH procedures in NR unlicensed spectrum will now be described. The ordinary 4-step RA has been the current standard for legacy systems such as LTE and NR Rel-15. It has been proposed to study a 2-step procedure where the uplink (UL) messages (PRACH+Msg3) are sent simultaneously and similarly the two downlink (DL) messages (e.g., time advance command in random access response (RAR) and contention resolution information) are sent as a simultaneous response in the DL. In the legacy 4-step procedure, one of the main usage of the first two messages is to obtain UL time alignment for the UE. In many situations, e.g. in small cells or for stationary UEs, this may not be needed since either a TA=0 will be sufficient (small cells) or a stored TA value from the last RA could serve also for the current RA (stationary UE). In future radio networks, it can be expected that these situations are common, both due to dense deployments of small cells and a great number of e.g. stationary IoT devices. A possibility to skip the message exchange to obtain the TA value would lead to reduced RA latency and would be beneficial in several use cases, for example, such as when transmitting infrequent small data packets. On the other hand, the 2-step RA will consume more resources since it uses contention based transmission of the data. This means that the resources that are configured for the data may often be unused.

If both the 4-step and two-step RA are configured in a cell (and for the UE), the UE will choose a preamble from one specific set if it wants to do a 4-step RA, and from another set if it wants to do a 2-step RA. Thus, a preamble partition is done to distinguish between 4-step and 2-step RA.

The legacy 4-step RA has been used in LTE and is also proposed as baseline for NR. FIG. 1 illustrates the 4-step RA procedure. As depicted, the UE randomly selects a preamble which is transmitted. When the eNB detects the preamble, it estimates the Timing alignment (TA) the UE should use in order to obtain UL synch at the eNB. The eNB responds with the TA, a grant for Msg3. In Msg3, the UE transmits its identifier, and the eNB responds by acknowledging the UE id in Msg 4. The Msg 4 gives contention resolution, i.e. only one UEs identifier will be sent even if several UEs have used the same preamble (and Msg 3) simultaneously. In LTE, the 4 step RA cannot be completed in less than 14 ms/TTI/SF.

The 2-step RA gives much shorter latency than the ordinary 4-step RA. FIG. 2 illustrates the 2-step RA procedure. In the 2-step RA procedure, the preamble and a message corresponding to Message 3 in the 4-step RA are transmitted in the same or in two subsequent sub frames. The Msg3 is sent on a resource dedicated to the specific preamble. This means that both the preamble and the Msg3 face contention but contention resolution in this case means that either both preamble and Msg3 are sent without collision or both collide. Upon successful reception of the preamble and Msg 3, the eNB will respond with a TA (which by assumption should not be needed or just give very minor updates) and a Msg 4 for contention resolution.

An issue that may occur if the UE TA is bad (e.g. using TA=0 in a large cell or using an old TA even though the UE has moved) is that only the preamble can be detected by the eNB. Because a transmission with an inaccurate TA value may interfere transmissions from other UEs in the same cell. Additionally, the preamble signal has higher detection probability than the normal data due to its design pattern. In this case the NW may reply with an ordinary RAR giving the UE an opportunity to transmit an ordinary Msg3 on a scheduled resource. This is a fallback to four step RA.

The BSR and Scheduling Request (SR) Framework in NR will now be discussed. In 3GPP TS 38.321-f00, the SR is used for requesting UL-SCH resources for new transmission.

The MAC entity may be configured with zero, one, or more SR configurations. An SR configuration consists of a set of PUCCH resources for SR transmission across different BWPs and cells. For a logical channel, at most one PUCCH resource for SR is configured per BWP.

Each SR configuration corresponds to one or more logical channels. Each logical channel may be mapped to zero or one SR configuration, which is configured by RRC. The SR configuration of the LCH that triggers the BSR (subclause 5.4.5) (if such a configuration exists) is considered as corresponding SR configuration for the triggered SR. For BSR triggered by retxBSR-Timer expiry, the corresponding SR configuration for the triggered SR is that of the highest priority LCH (if such a configuration exists) that has data available for transmission at the time the BSR is triggered.

FIG. 3 illustrates a typical dynamic scheduling procedure. In an unlicensed spectrum scenario, the UE or the gNB has to perform a channel sensing or LBT prior to any transmission in this procedure.

Certain problems exist, however. For example, in LTE LAA/eLAA/feLAA, there is no standalone unlicensed spectrum scenario, meaning that the UE doesn't need to support RACH and PUCCH-SR transmissions in the unlicensed spectrum cells as secondary cells since the transmissions can basically be transmitted over the licensed spectrum cells as primary cells.

However, NR unlicensed operation need to support both standalone and DC scenarios. Thus, both RACH and PUCCH-SR signaling needs to be transmitted over unlicensed spectrum cells since a NR-U cell may operate as a primary cell.

LAA has defined a channel access priority class (CAPC) for every PUSCH transmission in case Type 1 channel access is chosen. For a transmission of a Sounding Reference Signal without a PUSCH from a UE, the UE shall always utilize type 1 uplink channel access procedure with the highest priority class.

In order to implement the support for RACH in NR-U cell, one of the key aspects is how to support the channel access to the unlicensed channel, which are shared by NR-U UEs and other RATs.

As described in previous sections, in a MF cell, a UE supports either no LBT or LBT for both PRACH and PUCCH transmissions. Pure reuse of the existing rules in MulteFire for NR-U is not sufficient since in the existing RAT technologies such as MulteFire, the PUCCH-SR and PRACH signaling doesn't support differentiation between prioritized signaling and non-prioritized signaling depending on service types or RA events. However, NR-U as a new RAT for unlicensed spectrum is aiming to use existing NR RAT technology as the baseline, and introduce the support for unlicensed spectrum operations. In the existing NR licensed cells, PRACH accesses in NR can be categorized as prioritized access and non-prioritized access. For the prioritized ones, the UE can skip or perform backoff in short interval to reduce the RACH delay. The UE can perform faster power ramp for prioritized ones. Even for non-prioritized RA accesses, there may be different RA purposes. Therefore, it is not system resource efficient by always applying the same type/priority channel access for different RA events. At the same time, it is also not efficient for services with different Quality of Service (QoS) requirements.

An enhanced channel sensing mechanism has been proposed for RACH and PUCCH transmissions in unlicensed spectrum. Specifically, different channel sensing mechanisms (with different priority levels) are proposed for RACH and PUCCH transmissions triggered for different purposes. However, the proposed scheme using different channel sensing mechanisms have several things for further potential enhancements:

1) A complete RA or SR procedure comprises transmissions of multiple messages. For every transmission in the procedure, the transmitter has to perform a LBT or channel sensing operation in advance of the transmission. Due to the channel uncertainty, additional latency is introduced to the data transfer, which may be not acceptable for the QoS satisfaction of services.
2) A UE is not able to support a fully flexible configuration on the channel sensing mechanism for RA and SR transmissions. In other words, the channel sensing mechanism for a specific RA/SR event would be configured by the network via RRC signaling, or hard coded in a spec. As soon as a RA event is triggered, the UE selects a configured channel sensing mechanism to occupy the channel. The selected mechanism would be applicable for every transmission during the whole RA procedure. The configuration is a semi-static setting. The network is able to reconfigure the setting from time to time, however, it would bring intensive signaling overhead if the reconfiguration is performed for every RA access.
3) Even for a RA event triggered for a same purpose, an adaptive channel sensing mechanism may be necessary. When there is light load or channel occupancy in the cell, the channel can be easily grasped, in this case, the UE may try a LBT with higher priority level to reduce the access latency. When there is higher load or channel occupancy, a LBT operation with lower priority level may be beneficial so that the RA access can be better distributed and avoid RA burst.
4) For a RA procedure, it may be helpful to apply different channel sensing mechanism. In one example, the UE may choose a specific LBT scheme for Msg1 transmission based on configuration. After transmission of the Msg1, the situation is different so that it is more favorable for the UE or gNB to use a different LBT scheme for subsequent messages. in one example, the channel occupancy becomes higher so that the same LBT scheme may fail. In another example, the transmission of the Msg1 has already taken a long time so that there is limited time left for the reset RA messages thus the full RA procedure can meet a given latency requirement. In this case, it is better for the UE to choose a LBT scheme with higher priority level to further reduce the latency.

SUMMARY

Certain aspects of the present disclosure and their embodiments may provide solutions to these or other challenges. For example, according to certain embodiments, an enhanced channel sensing mechanism is proposed for RA and PUCCH transmissions, considering not only the purpose that the transmission is triggered for, but also other measurement metrics such as the varying channel occupancy and the varying UP latency. The proposed enhancement aims to achieve a good tradeoff between the reduction/avoidance of unnecessary LBT operations and the increased signaling overhead in the system.

According to certain embodiments, a method performed by a wireless device for enhanced channel occupancy sharing for RA and PUCCH is provided. The method includes, for a first transmission of a RA procedure, selecting a first channel sensing procedure for determining availability of a channel in the unlicensed spectrum. Based on the first channel sensing procedure, it is determined that the channel in the unlicensed spectrum is available. In response to determining that the channel in the unlicensed spectrum is available, a maximum channel occupancy time (MCOT) duration associated with the first channel sensing procedure is determined. The MCOT duration is an amount of time in which the wireless device and a network node are allowed to transmit on the channel in the unlicensed spectrum for the RA procedure. The wireless device transmits the first transmission during the MCOT duration and receives a second transmission from a network node. The second transmission includes a first listen-before-talk (LBT) scheme for a third transmission associated with the RA procedure.

According to certain embodiments, a method performed by a base station for enhanced channel occupancy sharing for RA and PUCCH in an unlicensed spectrum is provided. The method includes receiving, from a wireless device, a first transmission on a channel in the unlicensed spectrum, the first transmission associated with a RA procedure. Based on the first transmission, a MCOT duration is determined. The MCOT duration is associated with a first channel sensing procedure performed by the wireless device and includes an amount of time during which the wireless device and the base station can transmit on the channel in the unlicensed spectrum. It is determined whether the MCOT duration has expired. Prior to transmitting a second transmission to the wireless device, the base station determines whether to perform a second channel sensing procedure based on whether the MCOT duration has expired. The method further includes transmitting the second transmission to the wireless device. The second transmission includes a first a LBT scheme for a third transmission associated with the RA procedure.

According to certain embodiments, a wireless device for enhanced channel occupancy sharing for RA and PUCCH is provided. The wireless device includes processing circuitry configured to, for a first transmission of a RA procedure, selecting a first channel sensing procedure for determining availability of a channel in the unlicensed spectrum. Based on the first channel sensing procedure, the processing circuitry determines that the channel in the unlicensed spectrum is available. In response to determining that the channel in the unlicensed spectrum is available, a maximum channel occupancy time (MCOT) duration associated with the first channel sensing procedure is determined. The MCOT duration is an amount of time in which the wireless device and a network node are allowed to transmit on the channel in the unlicensed spectrum for the RA procedure. The processing circuitry is configured to transmit the first transmission during the MCOT duration and receives a second transmission from a network node. The second transmission includes a first LBT scheme for a third transmission associated with the RA procedure.

According to certain embodiments, a base station for enhanced channel occupancy sharing for RA and PUCCH in an unlicensed spectrum is provided. The base station includes processing circuitry configured to receive, from a wireless device, a first transmission on a channel in the unlicensed spectrum. The first transmission is associated with a RA procedure. Based on the first transmission, the processing circuitry is configured to determine a MCOT duration. The MCOT duration is associated with a first channel sensing procedure performed by the wireless device and includes an amount of time during which the wireless device and the base station can transmit on the channel in the unlicensed spectrum. The processing circuitry is configured to determine whether the MCOT duration has expired. Prior to transmitting a second transmission to the wireless device, the processing circuitry is configured to determine whether to perform a second channel sensing procedure based on whether the MCOT duration has expired. The processing circuitry is configured to transmit the second transmission to the wireless device. The second transmission includes a first a LBT scheme for a third transmission associated with the RA procedure.

Certain embodiments may provide one or more of the following technical advantages. For example, one technical advantage may be that certain embodiments optimize performance of RA with optimized latency management. As another example, a technical advantage may be increased radio connection maintenance in unlicensed spectrum. As still another example, a technical advantage may be reduced negative impact due to LBT failure on UL data transfer and UL RACH performance is eliminated.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which:

FIG. 1 illustrates the 4-step RA procedure;
FIG. 2 illustrates the 2-step RA procedure.

DETAILED DESCRIPTION

Figure 3:
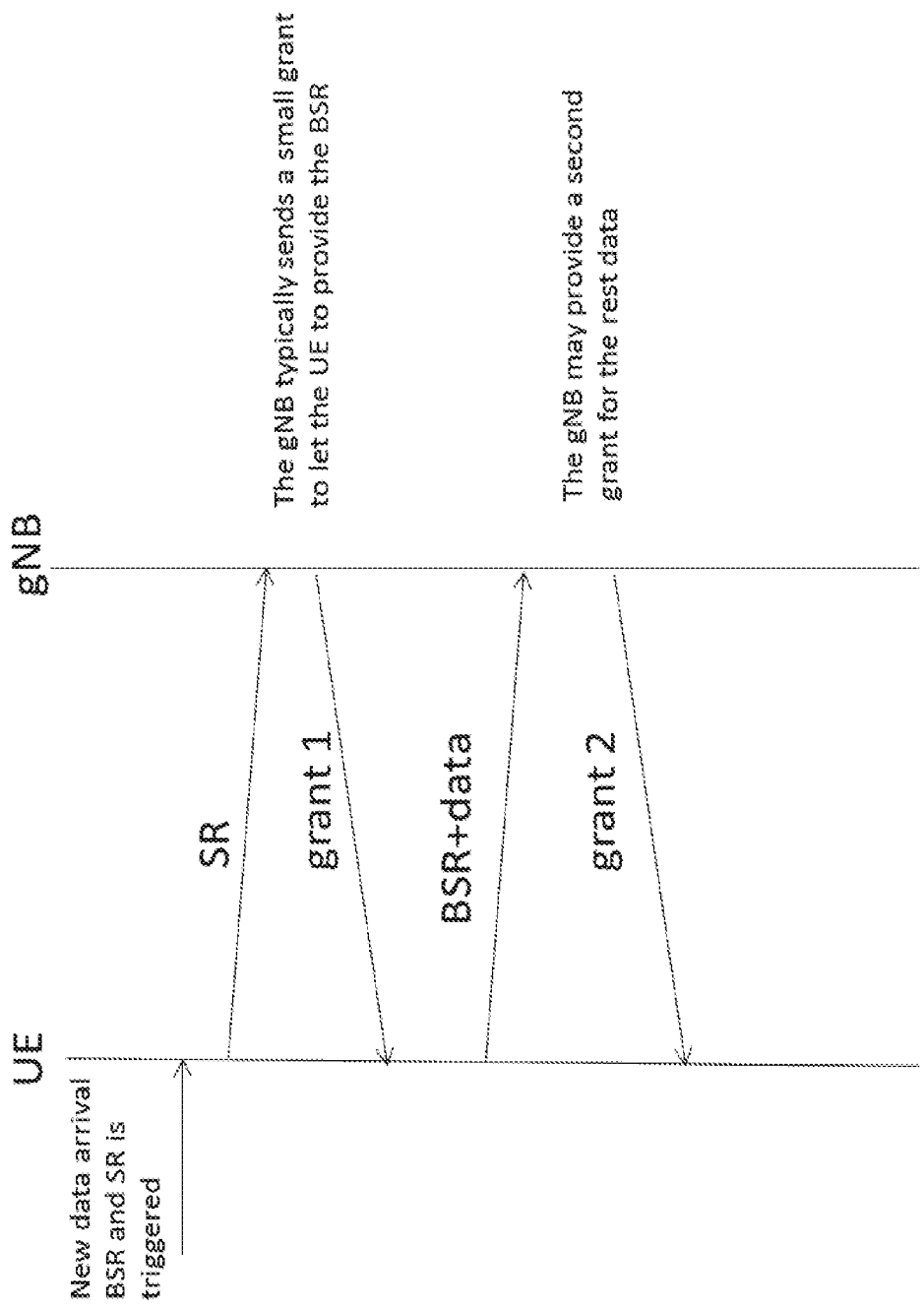
FIG. 3 illustrates a typical dynamic scheduling procedure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In some embodiments, a more general term "network node" may be used and may correspond to any type of radio network node or any network node, which communicates with a UE (directly or via another node) and/or with another network node. Examples of network nodes are NodeB, MeNB, ENB, a network node belonging to MCG or SCG, base station (BS), multi-standard radio (MSR) radio node such as MSR BS, eNodeB, gNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc), O&M, OSS, SON, positioning node (e.g. E-SMLC), MDT, test equipment (physical node or software), etc.

In some embodiments, the non-limiting term user equipment (UE) or wireless device may be used and may refer to any type of wireless device communicating with a network node and/or with another UE in a cellular or mobile communication system. Examples of UE are target device, device to device (D2D) UE, machine type UE or UE capable of machine to machine (M2M) communication, PDA, PAD, Tablet, mobile terminals, smart phone, laptop embedded equipped (LEE), laptop mounted equipment (LME), USB dongles, UE category M1, UE category M2, ProSe UE, V2V UE, V2X UE, etc.

Additionally, terminologies such as base station/gNodeB and UE should be considered non-limiting and do in particular not imply a certain hierarchical relation between the two; in general, "gNodeB" could be considered as device 1 and "UE" could be considered as device 2 and these two devices communicate with each other over some radio channel. And in the following the transmitter or receiver could be either gNB, or UE.

Several embodiments are described below to demonstrate shared channel sensing for PRACH and PUCCH transmissions. For example, according to certain embodiments, an enhanced channel sensing mechanism is proposed for RA and PUCCH transmissions, considering not only the purpose that the transmission is triggered for, but also other measurement metrics such as the varying channel occupancy and the varying UP latency. The proposed enhancement aims to achieve a good tradeoff between the reduction/avoidance of unnecessary LBT operations and the increased signaling overhead in the system.

According to certain embodiments, methods and systems may include:
1) Shared channel occupancy between the UE and gNB for the RA and SR procedure
2) Adaptive configuration/signaling for LBT settings based on channel occupancy and experienced latency variation
3) Flexible signaling means More specifically, according to certain embodiments, the configurable LBT schemes comprise at least one of the below LBT categories (also referred to as Type 1 or Type 2 channel access in 3GPP spec, e.g., TS 36.213-f00), but not limited to below examples;
Category 1: No LBT
Category 2: LBT without random back-off
Category 3: LBT with random back-off with fixed size of contention window
Category 4: LBT with random back-off with variable size of contention window Specifically for Category 4 LBT, to provide differentiation to channel access priorities based on the type of traffic served (e.g. VoIP, video, best effort, or background), four LBT priority classes are defined with different contention window sizes (CWS) and MCOT (after the transmitter has gained access to the channel, the transmitter is only allowed to transmit for a limited duration referred to as the maximum channel occupancy time (MCOT). Table 1 summarizes the MCOT and CWS for the downlink channel access priority classes, while Table 2 summarizes the MCOT and CWS for the uplink channel access priority classes.

TABLE 1

Channel Access Priority Class

| Channel Access Priority Class | MCOT | allowed CWS sizes |
|---|---|---|
| 1 | 2 ms | {3, 7} |
| 2 | 3 ms | {7, 15} |
| 3 | 8 or 10 ms | {15, 31, 63} |
| 4 | 8 or 10 ms | {15, 31, 63, 127, 255, 511, 1023} |

TABLE 2

Channel Access Priority Class for UL

| Channel Access Priority Class | MCOT | allowed CWS sizes |
|---|---|---|
| 1 | 2 ms | {3, 7} |
| 2 | 4 ms | {7, 15} |
| 3 | 6 ms or 10 ms | {15, 31, 63, 127, 255, 511, 1023} |
| 4 | 6 ms or 10 ms | {15, 31, 63, 127, 255, 511, 1023} |

Tables 1 and 2 correspond to Table 15.1.1-1 and the Table 15.2.1-1 in the spec 3GPP TS 36.213 V15.1.0, respectively. As described herein, the same channel access priority class for LBT operations may be applied for RACH and PUCCH transmissions. However, we are not limited to these examples.

The below example embodiments are described in the context of NR unlicensed spectrum (NR-U). However, the solutions described herein are not limited to NR-U scenarios. They are also applicable to other unlicensed operation scenarios such as LTE LAA/eLAA.

According to a particular embodiment, which may be considered a first embodiment, a complete RA procedure including all message transmissions can share a same MCOT. For the transmission of Msg1, the UE selects a LBT scheme based on configuration (i.e., the configuration is set considering the RA purpose and the QoS requirements of the service that has triggered the RA). Other messages in the RA procedure may use different LBT schemes. The MCOT is first determined based on the LBT scheme/priority selected for Msg1. However, the MCOT may be updated when the LBT scheme or priority has been changed for subsequent messages in the same RA procedure.

In a particular embodiment, the determination of MCOT may consider the used PRACH preamble format and the numerologies/transmission duration that are used for the PRACH message transmissions. In other words, a shorter MCOT may be configured in case the short PRACH preamble format or a high SCS (or short transmission duration) is applied to the PRACH message transmission. By sharing the same MCOT for the same RA procedure, there may be only one LBT/channel sensing operation performed by the transmitter (UE or gNB) during the RA procedure. Accordingly, the channel uncertainty due to LBT failure may be reduced. As a result, the latency for RA procedure may be reduced.

According to another particular embodiment, which may be considered a second embodiment, the configuration or reconfiguration of the LBT or channel sensing scheme for RA can be signaled by the gNB via RRC signaling. However, such signaling means may be more semi-static. The configuration may be also possible to be hard coded in a spec.

According to another particular embodiment, which may be considered a third embodiment, the configuration or reconfiguration of the LBT or channel sensing scheme for RA can be dynamically signaled by the gNB via a MAC CE or a DCI signaling.

According to yet another particular embodiment, which may be considered a fourth embodiment, the new LBT scheme for Msg3 transmission is signaled by the gNB in the RAR message. In case multiple RARs are multiplexed in the same MAC PDU, each RAR may acknowledge a specific preamble transmission. Each RAR may be configured with a different LBT scheme. In this case, multiple intended Msg3 transmissions (each of them is corresponding to a specific preamble transmission) from different UEs may share the same MCOT. In a particular embodiment, the gNB may configure a priority order between UEs for all intended Msg3 transmissions.

In a particular embodiment, each UE/Msg3 transmission may be configured with a portion of the remaining MCOT duration. The share of the remaining MCOT duration between UEs may be equally or different. The RA purpose or service QoS/priority may be consider when the gNB determines how to share the remaining MCOT between UEs.

According to another particular embodiment, which may be considered a fifth embodiment, a dynamic scheduling procedure (such as shown in FIG. 3), which includes all message transmissions, may share a same MCOT. For the transmission of the first message, i.e., SR signaling, the UE selects a LBT scheme based on configuration (e.g., the configuration is set considering the SR purpose and the QoS requirements of the service that has triggered the SR). Other messages in the RA procedure may use different LBT schemes. The MCOT is first determined based on the LBT scheme/priority selected for SR. However, the MCOT may be updated when the LBT scheme or priority has been changed for subsequent messages in the same SR procedure. The determination of MCOT may consider the used PUCCH-SR format and the numerologies/transmission duration that are used for the subsequent transmissions. In other words, a shorter MCOT may be configured in case the short PUCCH format or a high SCS (or short transmission duration) is applied to the subsequent message transmissions. By sharing the same MCOT for the same scheduling procedure, there may be only one LBT/channel sensing operation performed by the transmitter (UE or gNB) during the scheduling procedure, in such a way, the channel uncertainty due to LBT failure is reduced, therefore, the latency for scheduling procedure is reduced.

According to certain embodiments, any aforementioned embodiment that is related to the signaling means for PRACH transmission is also applicable to PUCCH-SR transmission.

According to certain embodiments, for any above embodiment, if the transmissions of a RA or SR procedure has occupied the channel for the time period according to MCOT and the RA or SR procedure has not completed yet, the transmitter may then stop the on-going transmission and perform a second LBT operation prior to subsequent transmissions. The second LBT operation may be chosen based on the configuration that has been signaled by the gNB.

For any of the above described embodiments, the configurations of the LBT schemes can be adaptively reconfigured based on the channel occupancy. In other words, a less aggressive/low priority LBT scheme may be chosen when the system is highly loaded or has high channel occupancy, while a more aggressive/high priority LBT scheme (or even no LBT operation) may be chosen when the system is lowly loaded or has low channel occupancy.

Additionally or alternatively, for any above described embodiments, the configurations of the LBT schemes can be adaptively reconfigured based on the other measurement indicators, such as radio channel quality indicators of a UE or the remaining latency budget. For example, if the radio channel quality allows a fast transmission, the UE may choose a more aggressive LBT operation. Conversely, if the radio channel quality does not allow a fast transmission, the UE may choose a less aggressive LBT operation. As another example, if the UE has limited latency budget, the UE may selects a more aggressive LBT option. Conversely, if the UE does not have a limited latency budget, the UE may choose a less aggressive LBT option.

According to certain embodiments, the adaptation of the LBT configurations may cover the tuning and reconfiguration in terms of the parameters, such as MCOT, LBT priority class, congestion window size, enabling or disabling LBT operation prior to transmission etc.

For any of the above described embodiments, a short LBT (e.g., with the duration of the period is fixed to be at least 25 μs) may be applied for every changing the transmission direction between downlink and uplink.

Figure 4:
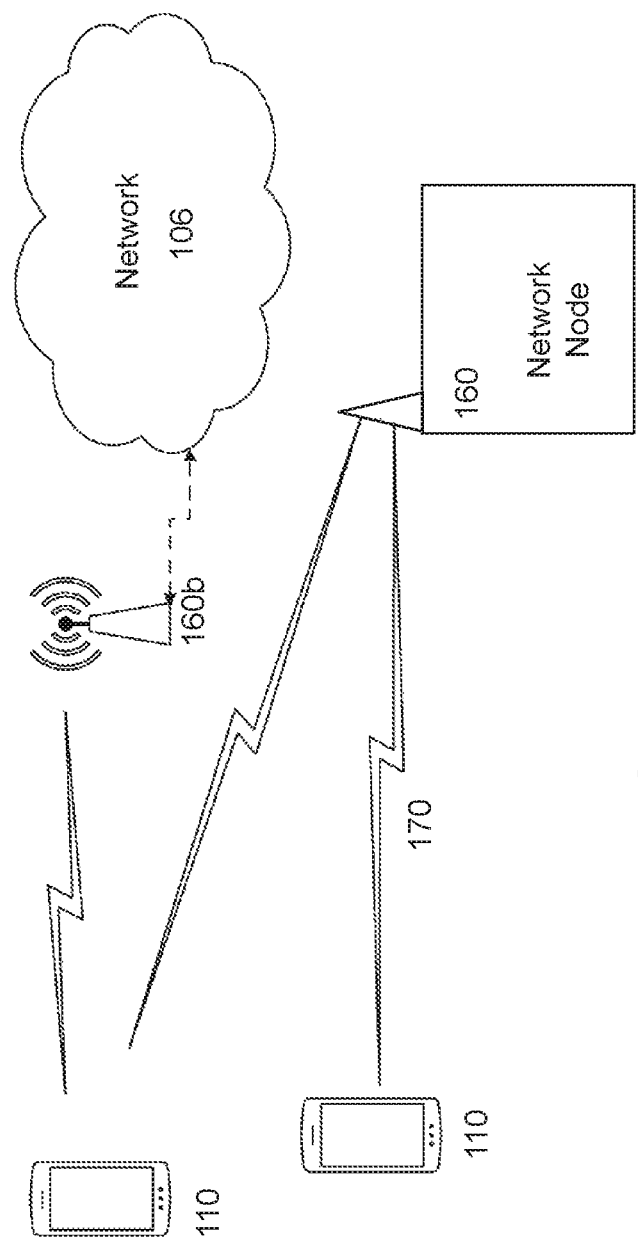
FIG. 4 illustrates an example wireless network for an enhanced channel sensing mechanism for RA and PUCCH transmissions; according to certain embodiments.

FIG. 4 illustrates a wireless network, in accordance with some embodiments. Although the subject matter described herein may be implemented in any appropriate type of system using any suitable components, the embodiments disclosed herein are described in relation to a wireless network, such as the example wireless network illustrated in FIG. 4. For simplicity, the wireless network of FIG. 4 only depicts network 106, network nodes 160 and 160b, and wireless devices 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and wireless device 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 5:
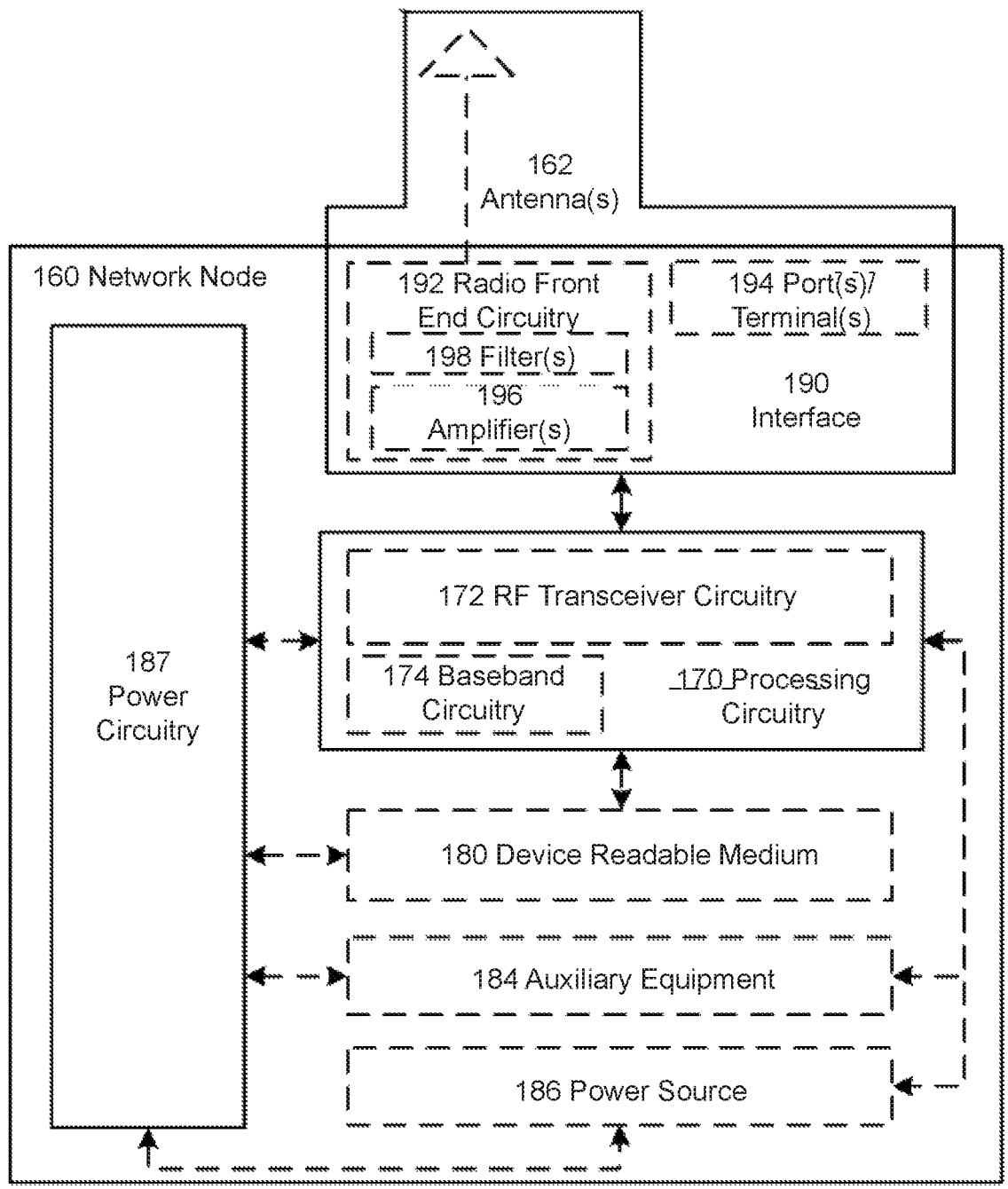
FIG. 5 illustrates an example network node, according to certain embodiments.

FIG. 5 illustrates an example network node 160, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 5, network node 160 includes processing circuitry 170, device readable medium 180, interface 190, auxiliary equipment 184, power source 186, power circuitry 187, and antenna 162. Although network node 160 illustrated in the example wireless network of FIG. 5 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units.

In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or wireless devices 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or wireless devices via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 5 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 6:
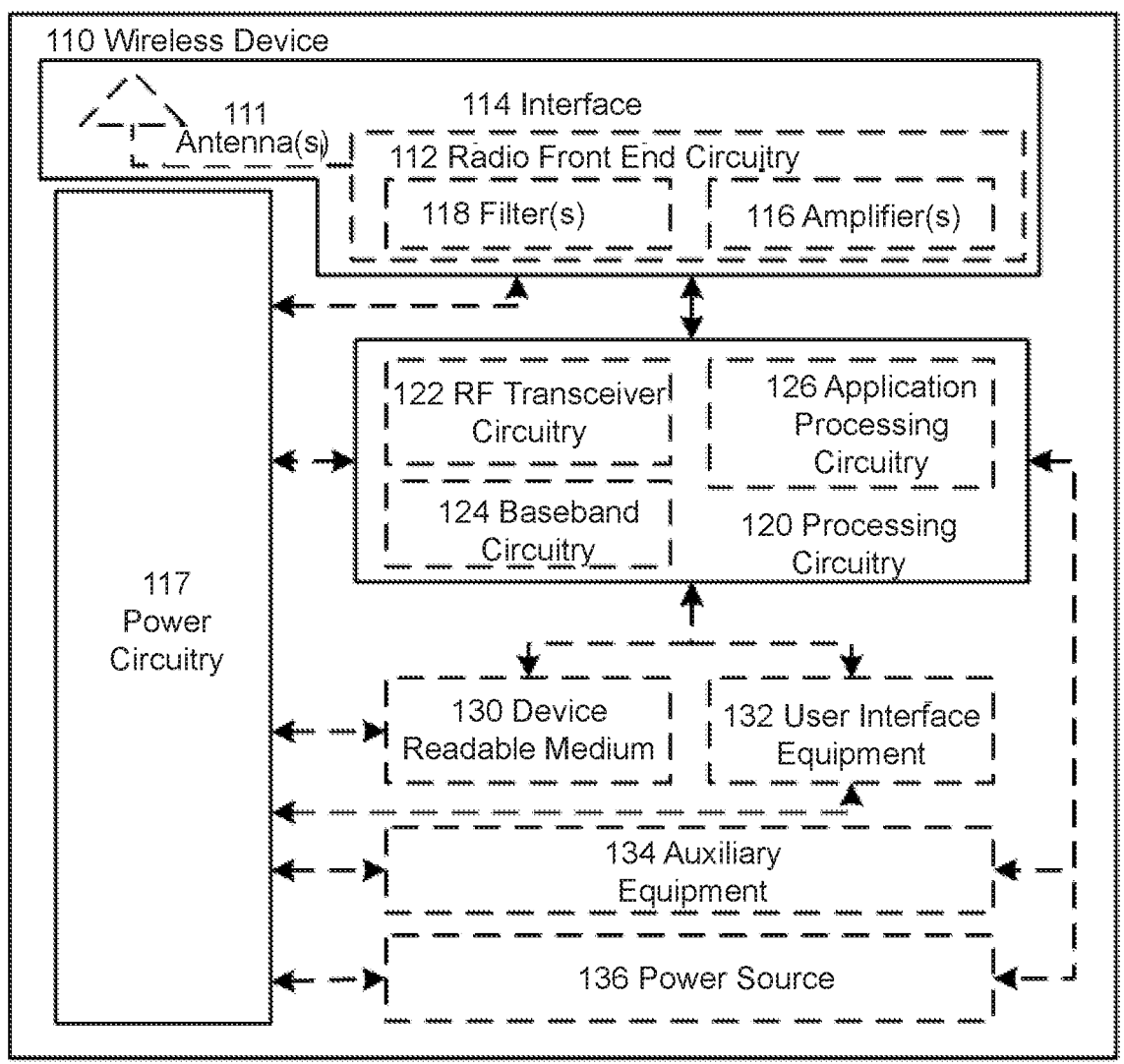
FIG. 6 illustrates an example wireless device, according to certain embodiments.

FIG. 6 illustrates an example wireless device, according to certain embodiments. As used herein, wireless device (wireless device) refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. wireless device 110 may include multiple sets of one or more of the illustrated components for different wireless technologies supported by wireless device 110, such as, for example, GSM, WCDMA, LTE, NR, WiFi, WiMAX, or Bluetooth wireless technologies, just to mention a few. These wireless technologies may be integrated into the same or different chips or set of chips as other components within wireless device 110.

Antenna 111 may include one or more antennas or antenna arrays, configured to send and/or receive wireless signals, and is connected to interface 114. In certain alternative embodiments, antenna 111 may be separate from wireless device 110 and be connectable to wireless device 110 through an interface or port. Antenna 111, interface 114, and/or processing circuitry 120 may be configured to perform any receiving or transmitting operations described herein as being performed by a wireless device. Any information, data and/or signals may be received from a network node and/or another wireless device. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120 and is configured to condition signals communicated between antenna 111 and processing circuitry 120. Radio front end circuitry 112 may be coupled to or a part of antenna 111. In some embodiments, wireless device 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or wireless devices via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 110 components, such as device readable medium 130, wireless device 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of wireless device 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a wireless device may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of wireless device 110, but are enjoyed by wireless device 110 as a whole, and/or by end users and the wireless network generally.

Processing circuitry 120 may be configured to perform any determining, calculating, or similar operations (e.g., certain obtaining operations) described herein as being performed by a wireless device. These operations, as performed by processing circuitry 120, may include processing information obtained by processing circuitry 120 by, for example, converting the obtained information into other information, comparing the obtained information or converted information to information stored by wireless device 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with wireless device 110. Such interaction may be of many forms, such as visual, audial, tactile, etc. User interface equipment 132 may be operable to produce output to the user and to allow the user to provide input to wireless device 110. The type of interaction may vary depending on the type of user interface equipment 132 installed in wireless device 110. For example, if wireless device 110 is a smart phone, the interaction may be via a touch screen; if wireless device 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into wireless device 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from wireless device 110, and to allow processing circuitry 120 to output information from wireless device 110. User interface equipment 132 may include, for example, a speaker, a display, vibrating circuitry, a USB port, a headphone interface, or other output circuitry. Using one or more input and output interfaces, devices, and circuits, of user interface equipment 132, wireless device 110 may communicate with end users and/or the wireless network and allow them to benefit from the functionality described herein.

Auxiliary equipment 134 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. wireless device 110 may further comprise power circuitry 137 for delivering power from power source 136 to the various parts of wireless device 110 which need power from power source 136 to carry out any functionality described or indicated herein. Power circuitry 137 may in certain embodiments comprise power management circuitry. Power circuitry 137 may additionally or alternatively be operable to receive power from an external power source; in which case wireless device 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of wireless device 110 to which power is supplied.

Figure 7:
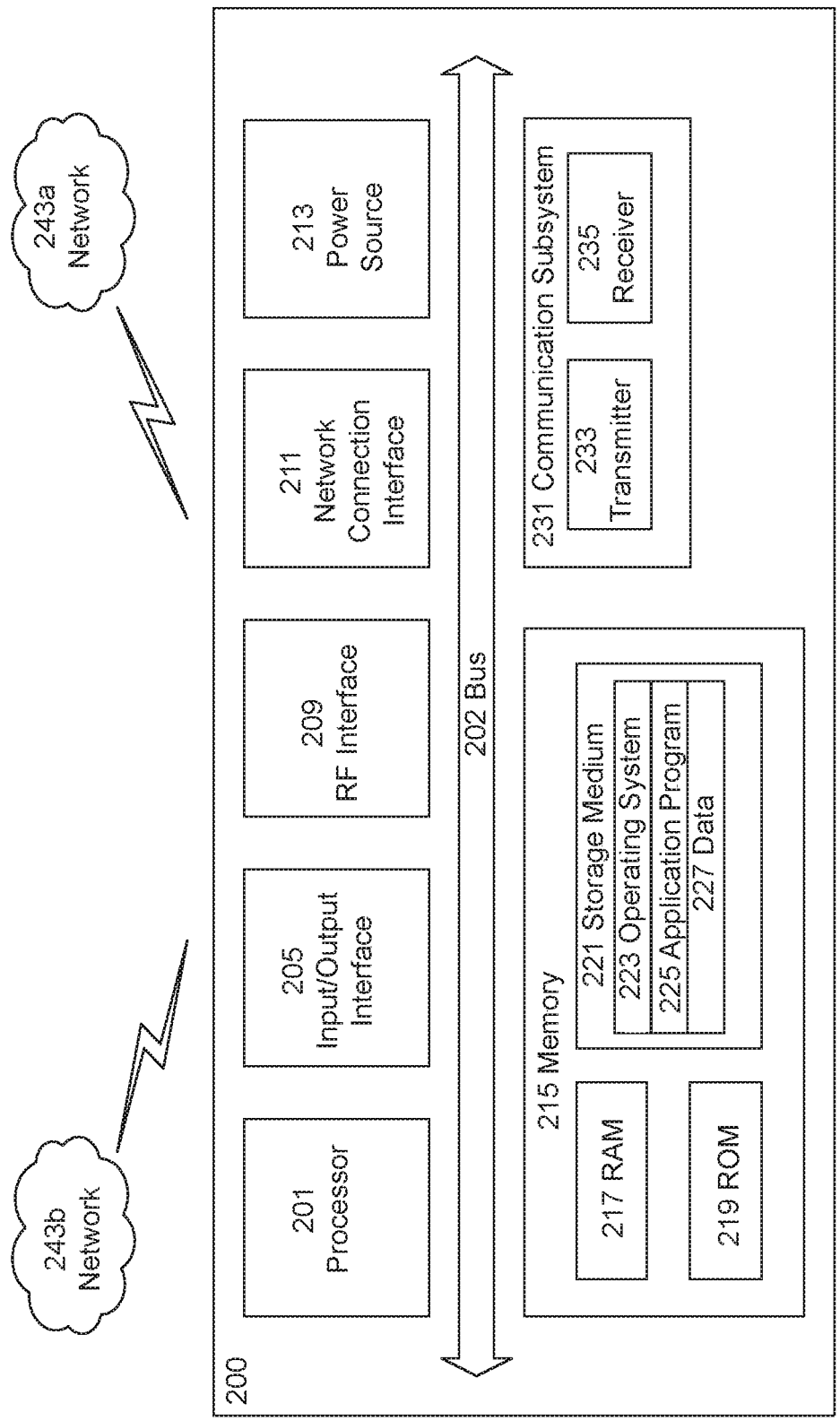
FIG. 7 illustrate an example user equipment, according to certain embodiments.

FIG. 7 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 7, is one example of a wireless device configured for communication in accordance with one or more communication standards promulgated by the $3^{rd}$ Generation Partnership Project (3GPP), such as 3GPP's GSM, UMTS, LTE, and/or 5G standards. As mentioned previously, the term wireless device and UE may be used interchangeable. Accordingly, although FIG. 7 is a UE, the components discussed herein are equally applicable to a wireless device, and vice-versa.

In FIG. 7, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 7, or only a subset of the components. The level of integration between the components may vary from one UE to another UE. Further, certain UEs may contain multiple instances of a component, such as multiple processors, memories, transceivers, transmitters, receivers, etc.

In FIG. 7, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 7, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 7, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another wireless device, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 8:
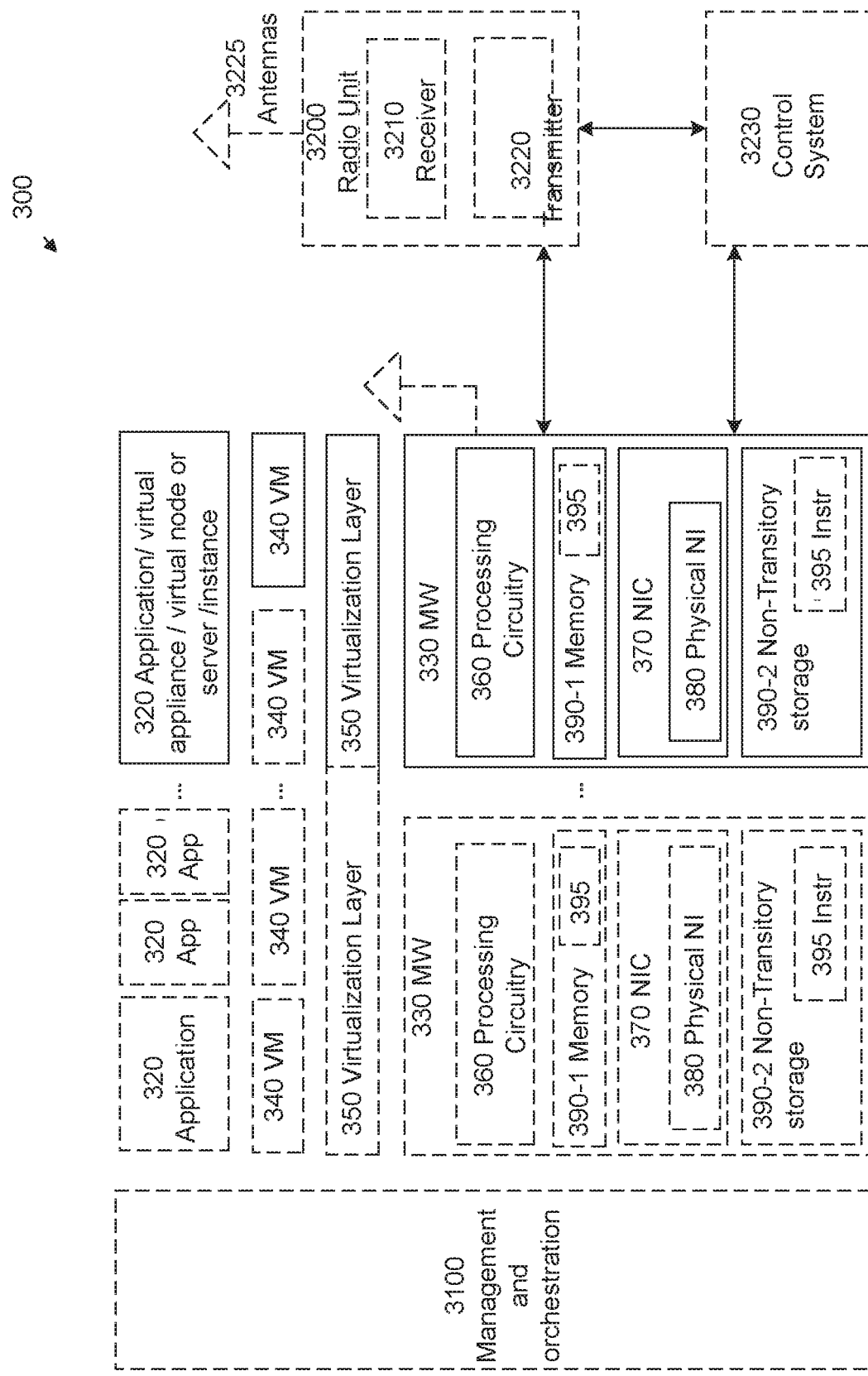
FIG. 8 illustrates a virtualization environment in which functions implemented by some embodiments may be virtualized, according to certain embodiments.

FIG. 8 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 8, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 8.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be affected with the use of control system 3230 which may alternatively be used for communication between the hardware nodes 330 and radio units 3200.

Figure 9:
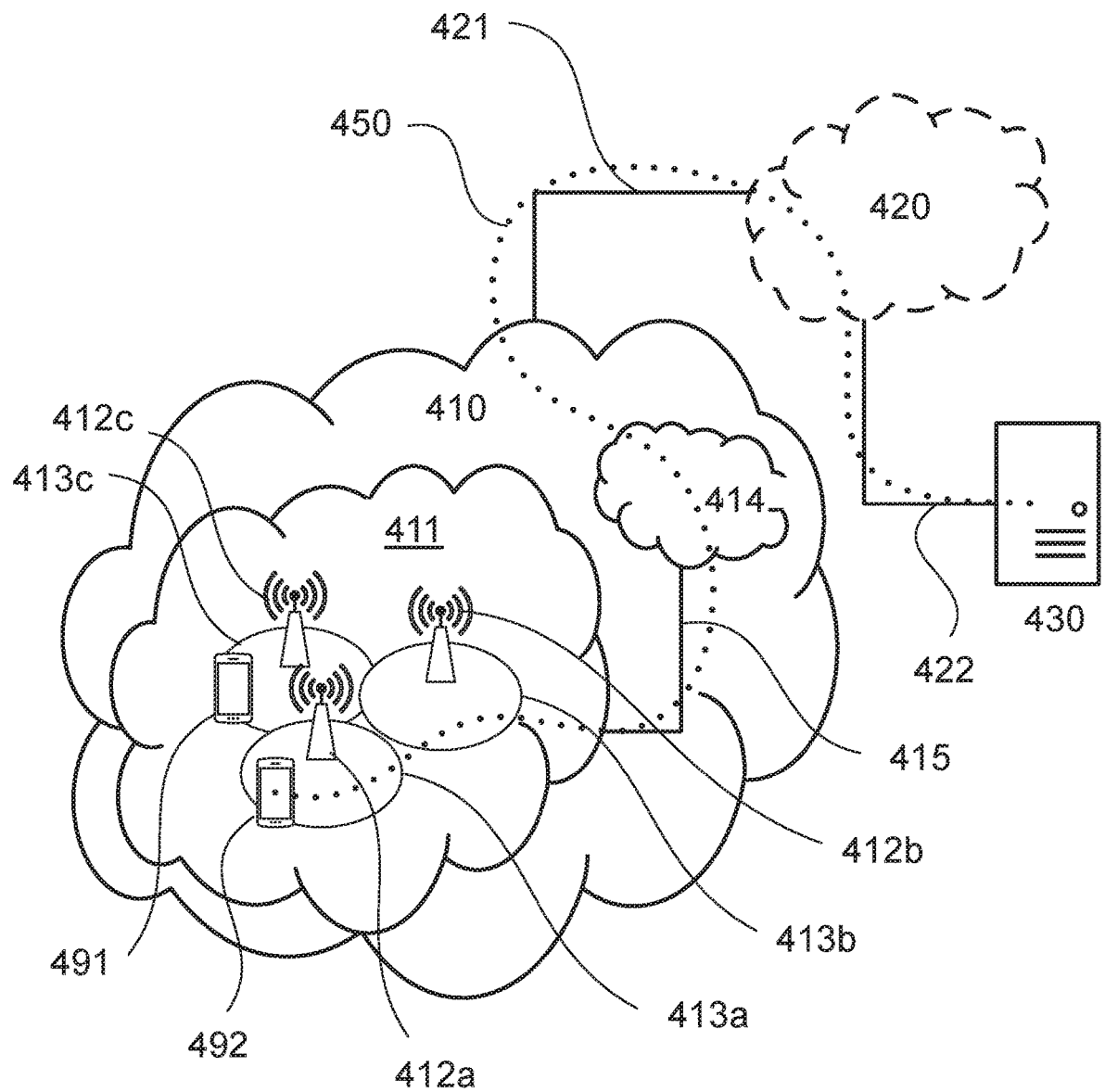
FIG. 9 illustrates a telecommunication network connected via an intermediate network to a host computer, according to certain embodiments.

FIG. 9 illustrates a telecommunication network connected via an intermediate network to a host computer in accordance with some embodiments.

With reference to FIG. 9, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 9 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 10:
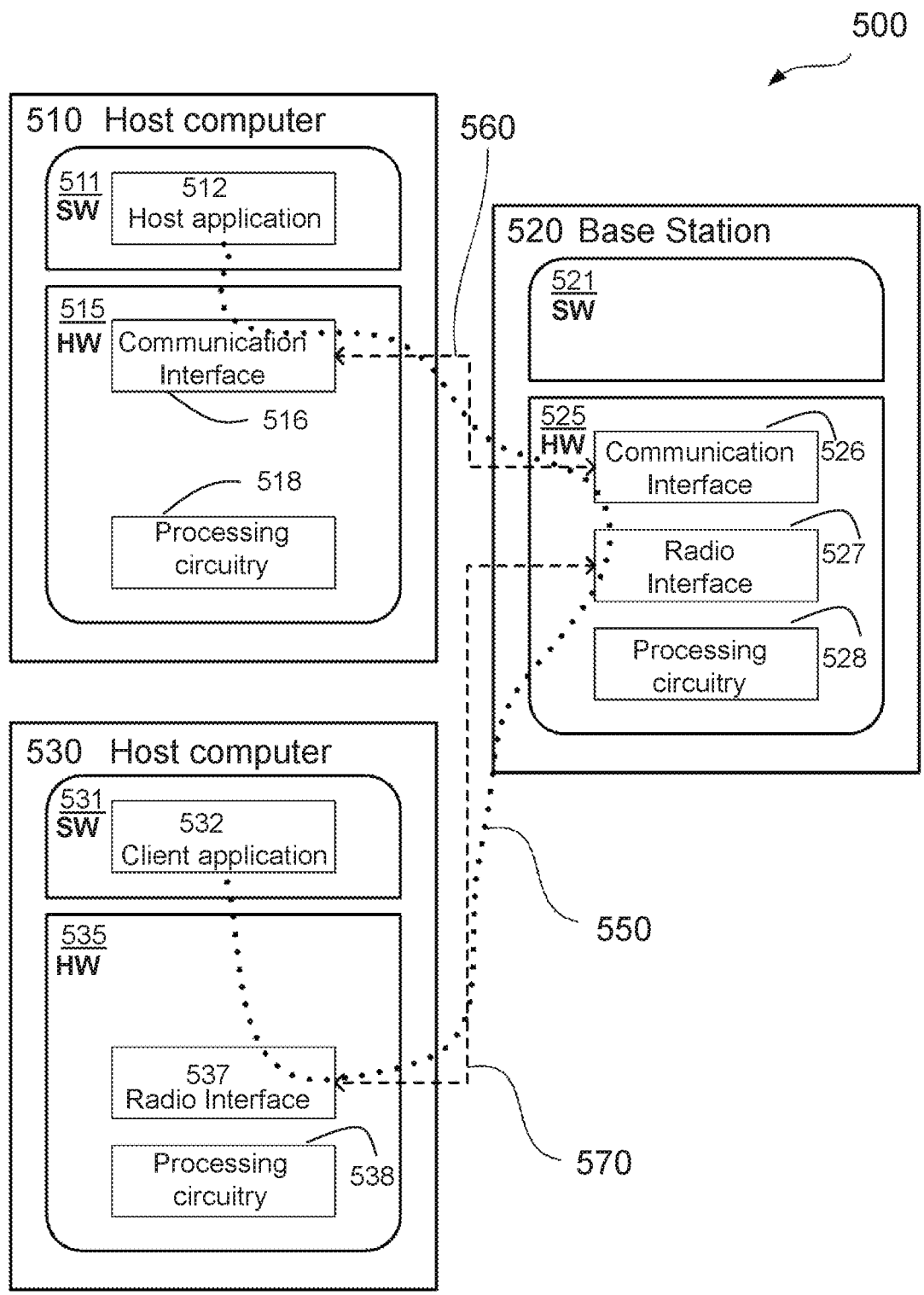
FIG. 10 illustrates a generalized block diagram of a host computer communicating via a base station with a user equipment over a partially wireless connection, according to certain embodiments.

FIG. 10 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 10. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 10) served by base station 520. Communication interface 526 may be configured to facilitate connection 560 to host computer 510. Connection 560 may be direct or it may pass through a core network (not shown in FIG. 10) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 10 may be similar or identical to host computer 430, one of base stations 412a, 412b, 412c and one of UEs 491, 492 of FIG. 9, respectively. This is to say, the inner workings of these entities may be as shown in FIG. 10 and independently, the surrounding network topology may be that of FIG. 9.

In FIG. 10, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the data rate, latency, and/or power consumption and thereby provide benefits such as reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figures 11, 12:
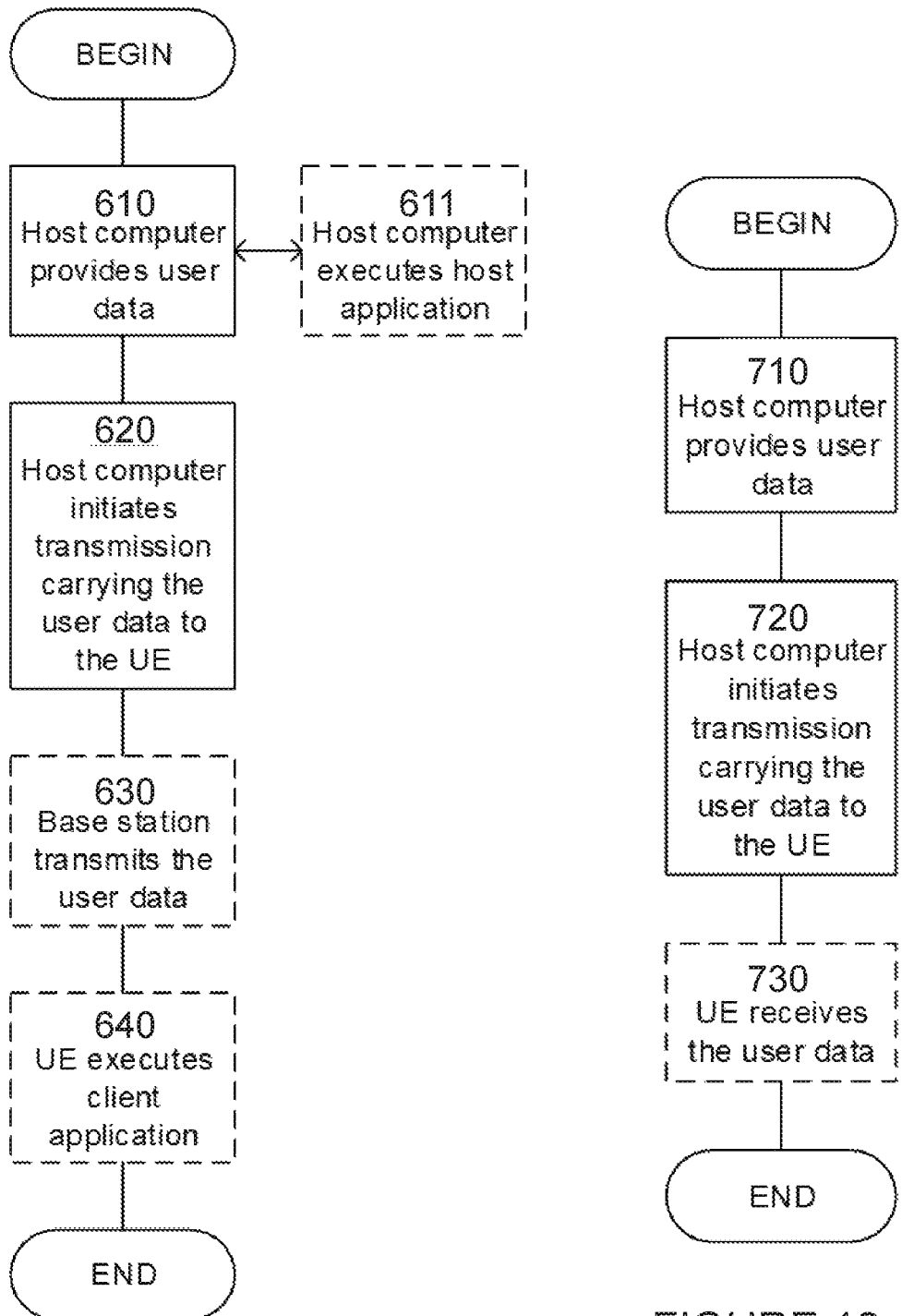
FIG. 11 illustrates a method implemented in a communication system, according to one embodiment.
FIG. 12 illustrates another method implemented in a communication system, according to one embodiment.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figures 13, 14:
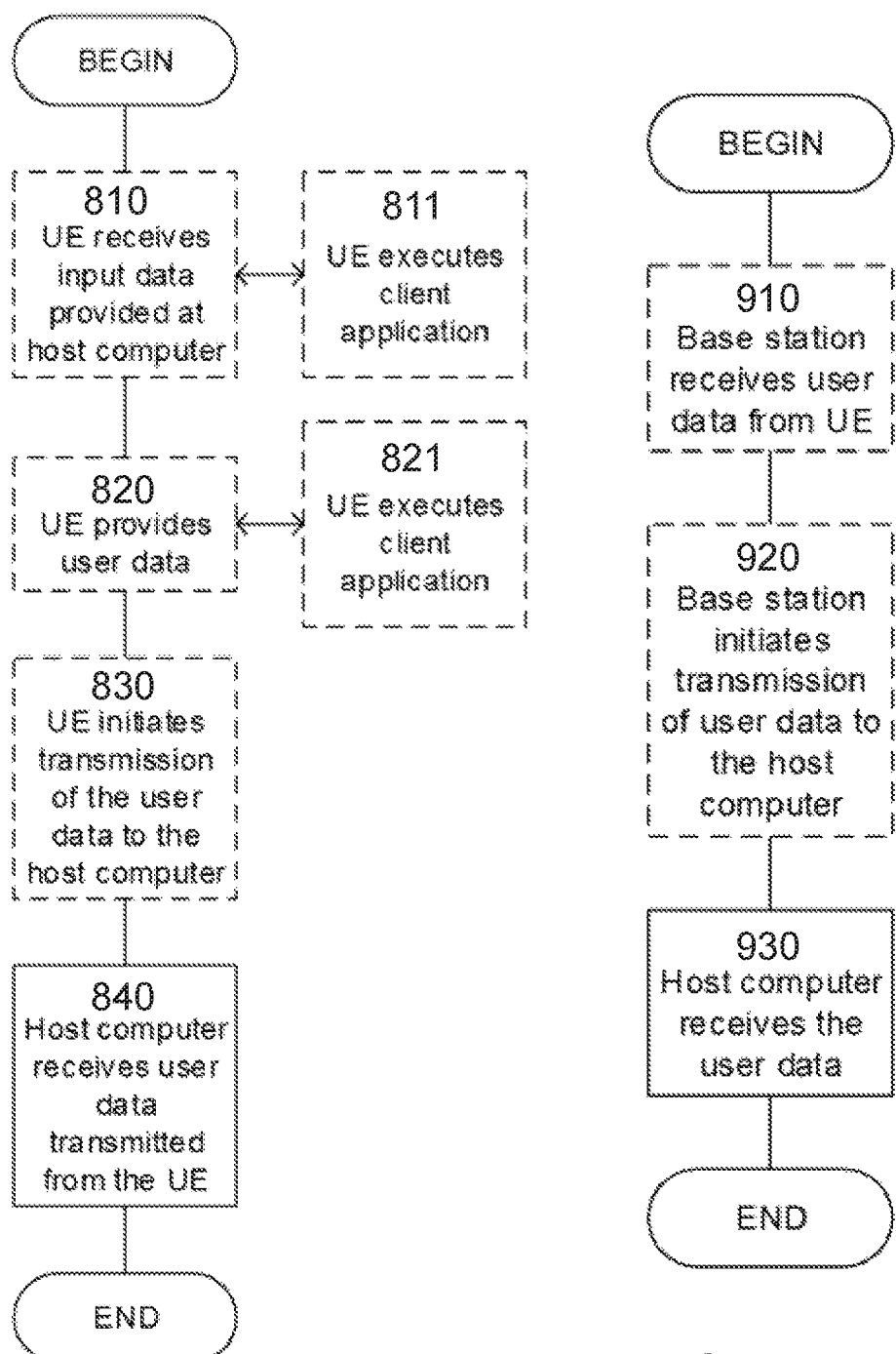
FIG. 13 illustrates another method implemented in a communication system, according to one embodiment.
FIG. 14 illustrates another method implemented in a communication system, according to one embodiment.

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Figure 15:
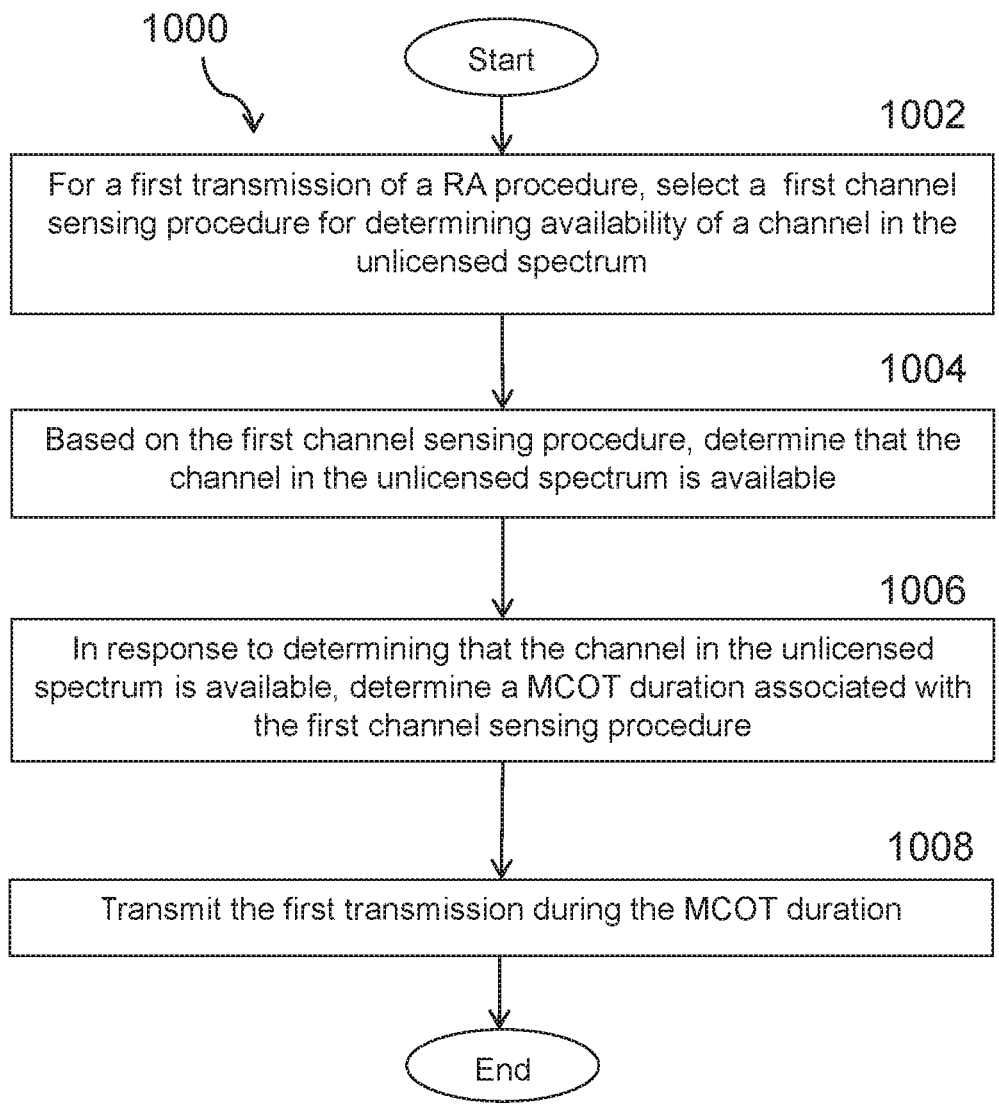
FIG. 15 illustrates an example method by a wireless device for enhanced channel occupancy sharing for RA and PUCCH, according to certain embodiments.

FIG. 15 depicts a method by a wireless device for enhanced channel occupancy sharing for RA and PUCCH in an unlicensed spectrum, according to certain embodiments. At step 1002, for a first transmission of a RA procedure, the wireless device selects a first channel sensing procedure for determining availability of a channel in the unlicensed spectrum. Based on the first channel sensing procedure, the wireless device determines that the channel in the unlicensed spectrum is available, at step 1004. In response to determining that the channel in the unlicensed spectrum is available, the wireless device determines a MCOT duration associated with the first channel sensing procedure, at step 1006. The MCOT duration comprises an amount of time in which the wireless device and a network node are allowed to transmit on the channel in the unlicensed spectrum for the RA procedure. Stated differently the MCOT duration may include an amount of time that it is assumed that the channel will be available for the RA procedure based on the first channel sensing procedure that was performed. At step 1008, the wireless device transmits the first transmission during the MCOT duration.

Figure 16:
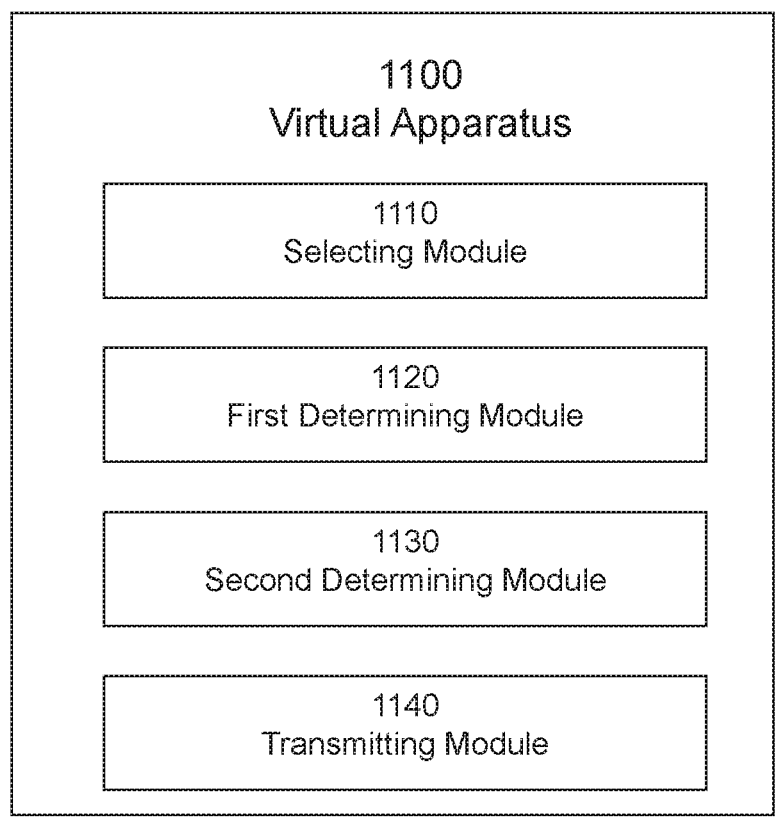
FIG. 16 illustrates an exemplary virtual computing device for enhanced channel occupancy sharing for RA and PUCCH, according to certain embodiments.

FIG. 16 illustrates a schematic block diagram of a virtual apparatus 1100 in a wireless network (for example, the wireless network shown in FIG. 4). The apparatus may be implemented in a wireless device or network node (e.g., wireless device 110 or network node 160 shown in FIG. 4). Apparatus 1100 is operable to carry out the example method described with reference to FIG. 15 and possibly any other processes or methods disclosed herein. It is also to be understood that the method of FIG. 15 is not necessarily carried out solely by apparatus 1100. At least some operations of the method can be performed by one or more other entities.

Virtual Apparatus 1100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause selecting module 1110, first determining module 1120, second determining module 1130, transmitting module 1140, and any other suitable units of apparatus 1100 to perform corresponding functions according one or more embodiments of the present disclosure.

According to certain embodiments, selecting module 1110 may perform certain of the selecting functions of the apparatus 1100. For example, selecting module 1110 may select a first channel sensing procedure for determining availability of a channel in the unlicensed spectrum.

According to certain embodiments, first determining module 1120 may perform certain of the determining functions of the apparatus 1100. For example, first determining module 1120 may determine that the channel in the unlicensed spectrum is available based on the first channel sensing procedure.

According to certain embodiments, second determining module 1130 may perform certain other of the determining functions of the apparatus 1100. For example, in response to determining that the channel in the unlicensed spectrum is available, second determining module 1130 may determine a MCOT duration associated with the first channel sensing procedure. The MCOT duration comprises an amount of time in which the wireless device and a network node are allowed to transmit on the channel in the unlicensed spectrum for the RA procedure.

According to certain embodiments, transmitting module 1140 may perform certain of the transmitting functions of the apparatus 1100. For example, transmitting module 1140 may transmit the first transmission during the MCOT duration.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 17:
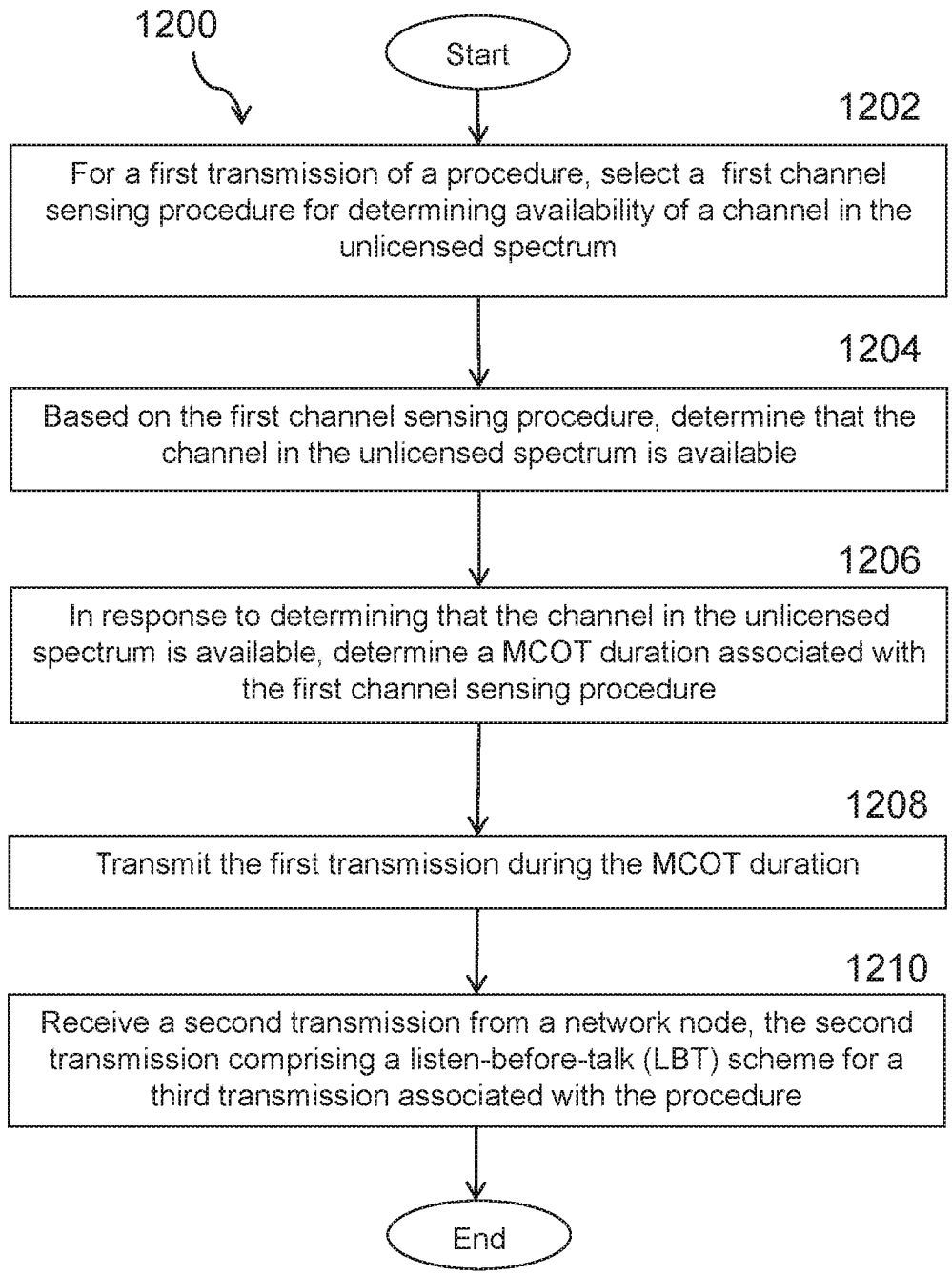
FIG. 17 illustrates another example method by a wireless device for enhanced channel occupancy sharing for RA and PUCCH, according to certain embodiments.

FIG. 17 depicts another method by a wireless device 110 for enhanced channel occupancy sharing for RA and PUCCH in an unlicensed spectrum, according to certain embodiments. At step 1202, for a first transmission of a procedure, the wireless device 110 selects a first channel sensing procedure for determining availability of a channel in the unlicensed spectrum. Based on the first channel sensing procedure, the wireless device 110 determines that the channel in the unlicensed spectrum is available, at step 1204. In response to determining that the channel in the unlicensed spectrum is available, the wireless device 110 determines a MCOT duration associated with the first channel sensing procedure, at step 1206. The MCOT duration comprises an amount of time in which the wireless device 110 and a network node 160 are allowed to transmit on the channel in the unlicensed spectrum for the procedure. Stated differently the MCOT duration may include an amount of time that it is assumed that the channel will be available for the procedure based on the first channel sensing procedure that was performed. At step 1208, the wireless device 110 transmits the first transmission during the MCOT duration. At step 1210, the wireless device 110 receives a second transmission from a network node 160, the second transmission comprising a first LBT scheme for a third transmission associated with the procedure.

In a particular embodiment, the first channel sensing procedure comprises a second LBT scheme.

In a particular embodiment, the first channel sensing procedure is selected based on a LBT priority selected for the first transmission.

In a particular embodiment, the procedure is a RA procedure, the first transmission is a Msg1, and the second transmission is a Msg2.

In a particular embodiment, the method further includes selecting at least one of a PRACH preamble format and a PRACH resource for the first transmission. The MCOT duration may be determined based on at least one of the PRACH preamble format and the PRACH resource, and the PRACH preamble format or PRACH resource may be used by a receiver of the first transmission to determine the MCOT duration.

In a particular embodiment, the MCOT duration is determined based on at least one of a numerology associated with the PRACH preamble format and a transmission duration for PRACH message transmissions.

In a particular embodiment, the wireless device selects a shorter MCOT duration for a shorter PRACH preamble format and a longer MCOT duration for a longer PRACH preamble format.

In a particular embodiment, the wireless selects a shorter MCOT duration for a higher SCS and a longer MCOT duration for a shorter for a lower SCS.

In a particular embodiment, the first channel sensing procedure is selected based on at least one of a RA purpose associated with an RA event and a QoS requirement associated with the RA event.

In a particular embodiment, the method further includes determining that the MCOT duration has not expired and, prior to an expiration of the MCOT duration and without performing a second channel sensing procedure, transmitting the third transmission of the RA procedure during the MCOT duration.

In a particular embodiment, the method further includes determining a second channel sensing procedure for a second transmission and updating the MCOT duration based on the second channel sensing procedure for the third transmission.

In a particular embodiment, the second channel sensing procedure is performed for a shorter duration than the first channel sensing procedure.

In a particular embodiment, the third transmission comprises a Msg3.

In a particular embodiment, updating the MCOT duration comprises changing the MCOT duration to a new MCOT duration associated with the LBT scheme for the third transmission associated with the procedure.

In a particular embodiment, the second channel sensing procedure for the third transmission is determined based on an indicator received from a network node in the second transmission. The second transmission includes a RAR message from the network node.

In a particular embodiment, the first channel sensing procedure is selected based on an indicator received from the network node, the indicator received via radio resource control signaling, a MAC control element, or DCI signaling.

In a particular embodiment, the procedure is a PUCCH procedure and the first transmission comprises a PUCCH-SR transmission.

In a particular embodiment, the method further includes determining that the MCOT duration has expired and that the procedure has not completed and performing a second channel sensing procedure prior to sending the third transmission.

In a particular embodiment, the second channel sensing procedure is selected based on an indication received from the network node.

In a particular embodiment, the first channel sensing procedure is selected based on a level of channel occupancy.

In a particular embodiment, the first channel sensing procedure is selected based on a channel measurement.

In a particular embodiment, the channel measurement comprises one or more of RSRP, RSRQ, and RSSI.

In a particular embodiment, the method further includes determining a congestion window size based on at least one of the MCOT duration or the first channel sensing procedure.

In a particular embodiment, the method further includes detecting a RA event triggering the procedure, which includes at least the first transmission to be transmitted on a channel in the unlicensed spectrum.

In a particular embodiment, detecting the RA event triggering the procedure comprises obtaining data to be transmitted in the first transmission.

In a particular embodiment, the wireless device 110 is a UE.

Figure 18:
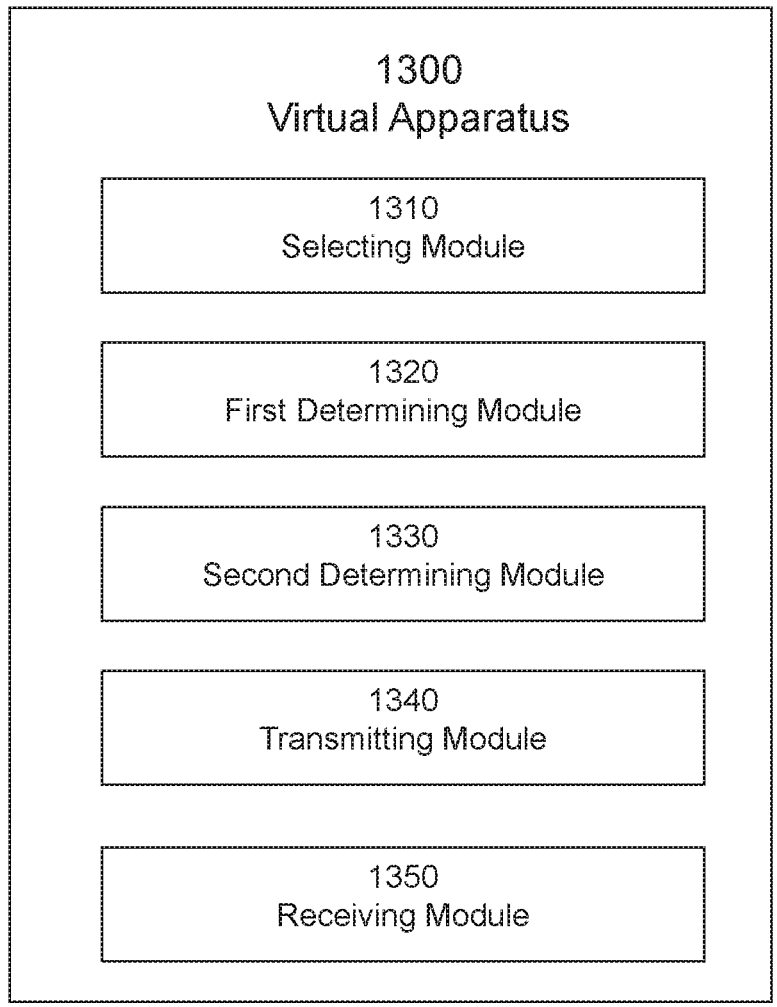
FIG. 18 illustrates another exemplary virtual computing device for enhanced channel occupancy sharing for RA and PUCCH, according to certain embodiments.

FIG. 18 illustrates a schematic block diagram of a virtual apparatus 1300 in a wireless network (for example, the wireless network shown in FIG. 4). The apparatus may be implemented in a wireless device or network node (e.g., wireless device 110 or network node 160 shown in FIG. 4). Apparatus 1300 is operable to carry out the example method described with reference to FIG. 17 and possibly any other processes or methods disclosed herein. It is also to be understood that the method of FIG. 17 is not necessarily carried out solely by apparatus 1300. At least some operations of the method can be performed by one or more other entities.

Virtual Apparatus 1300 may comprise processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause selecting module 1310, first determining module 1320, second determining module 1330, transmitting module 1340, receiving module 1350, and any other suitable units of apparatus 1300 to perform corresponding functions according one or more embodiments of the present disclosure.

According to certain embodiments, selecting module 1310 may perform certain of the selecting functions of the apparatus 1300. For example, selecting module 1310 may select a first channel sensing procedure for determining availability of a channel in the unlicensed spectrum.

According to certain embodiments, first determining module 1320 may perform certain of the determining functions of the apparatus 1300. For example, first determining module 1320 may determine that the channel in the unlicensed spectrum is available based on the first channel sensing procedure.

According to certain embodiments, second determining module 1330 may perform certain other of the determining functions of the apparatus 1300. For example, in response to determining that the channel in the unlicensed spectrum is available, second determining module 1330 may determine a MCOT duration associated with the first channel sensing procedure. The MCOT duration comprises an amount of time in which the wireless device and a network node are allowed to transmit on the channel in the unlicensed spectrum for the procedure.

According to certain embodiments, transmitting module 1340 may perform certain of the transmitting functions of the apparatus 1300. For example, transmitting module 1340 may transmit the first transmission during the MCOT duration.

According to certain embodiments, receiving module 1350 may perform certain of the receiving functions of the apparatus 1300. For example, receiving module 1350 may receive a second transmission from a network node 160, the second transmission comprising a first LBT scheme for a third transmission associated with the procedure The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 19:
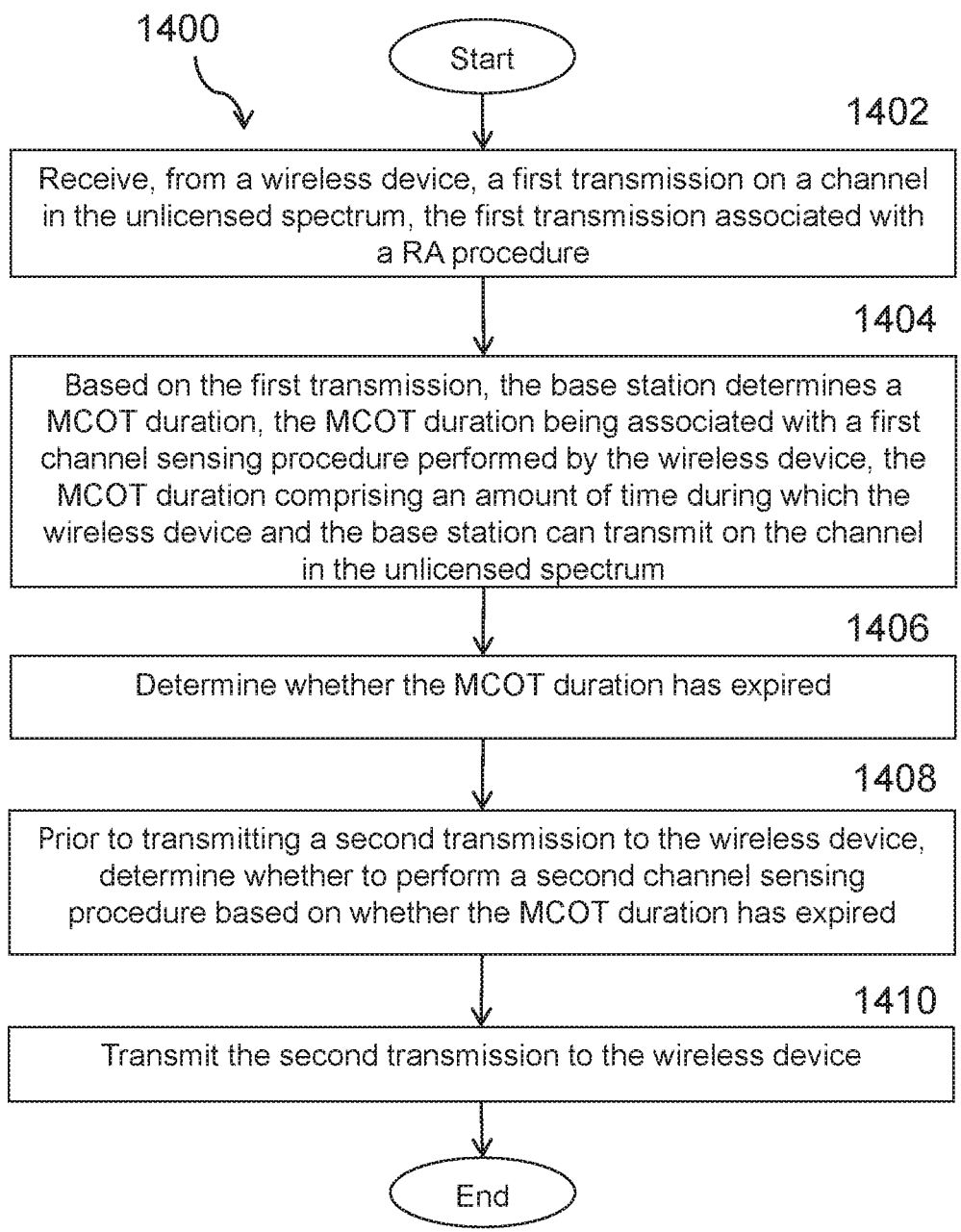
FIG. 19 illustrates an example method by a base station for enhanced channel occupancy sharing for RA and PUCCH, according to certain embodiments.

FIG. 19 depicts a method performed by a network node such as, for example, a base station, for enhanced channel occupancy sharing for RA and PUCCH in an unlicensed spectrum, according to certain embodiments. At step 1402, the base station receives, from a wireless device, a first transmission on a channel in the unlicensed spectrum. The first transmission is associated with a RA procedure. At step 1404, based on the first transmission, the base station determines a MCOT duration. The MCOT duration is associated with a first channel sensing procedure performed by the wireless device and comprises an amount of time during which the wireless device and the base station can transmit on the channel in the unlicensed spectrum. At step 1406, the base station determines whether the MCOT duration has expired. At step 1408, prior to transmitting a second transmission to the wireless device, the base station determines whether to perform a second channel sensing procedure based on whether the MCOT duration has expired. At step 1410, the base station transmits the second transmission to the wireless device.

Figure 20:
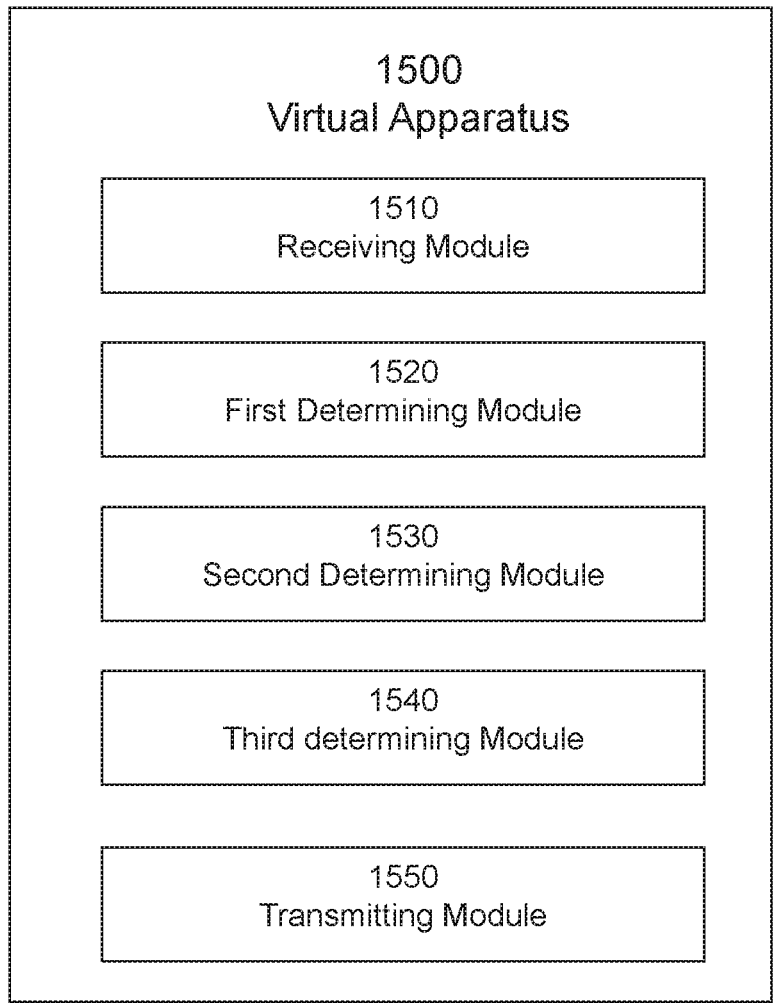
FIG. 20 illustrates another exemplary virtual computing device for enhanced channel occupancy sharing for RA and PUCCH, according to certain embodiments.

FIG. 20 illustrates a schematic block diagram of a virtual apparatus 1500 in a wireless network (for example, the wireless network shown in FIG. 4). The apparatus may be implemented in a wireless device or network node (e.g., wireless device 110 or network node 160 shown in FIG. 4). Apparatus 1500 is operable to carry out the example method described with reference to FIG. 19 and possibly any other processes or methods disclosed herein. It is also to be understood that the method of FIG. 19 is not necessarily carried out solely by apparatus 1500. At least some operations of the method can be performed by one or more other entities.

Virtual Apparatus 1500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving module 1510, first determining module 1520, second determining module 1530, third determining module 1540, transmitting module 1550, and any other suitable units of apparatus 1500 to perform corresponding functions according one or more embodiments of the present disclosure.

According to certain embodiments, receiving module 1510 may perform certain of the receiving functions of the apparatus 1500. For example, receiving module 1510 may receive, from a wireless device, a first transmission on a channel in the unlicensed spectrum. The first transmission is associated with a RA procedure.

According to certain embodiments, first determining module 1520 may perform certain of the determining functions of the apparatus 1500. For example, first determining module 1520 may determine, based on the first transmission, a MCOT duration. The MCOT duration is associated with a first channel sensing procedure performed by the wireless device and comprises an amount of time during which the wireless device and the base station can transmit on the channel in the unlicensed spectrum.

According to certain embodiments, second determining module 1530 may perform certain other of the determining functions of the apparatus 1500. For example, second determining module 1530 may determine whether the MCOT duration has expired.

According to certain embodiments, third determining module 1540 may perform certain other of the determining functions of the apparatus 1500. For example, third determining module 1540 may determine whether to perform a second channel sensing procedure based on whether the MCOT duration has expired prior to transmitting a second transmission to the wireless device.

According to certain embodiments, transmitting module 1550 may perform certain of the transmitting functions of the apparatus 1500. For example, transmitting module 1550 may transmit the second transmission to the wireless device.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 21:
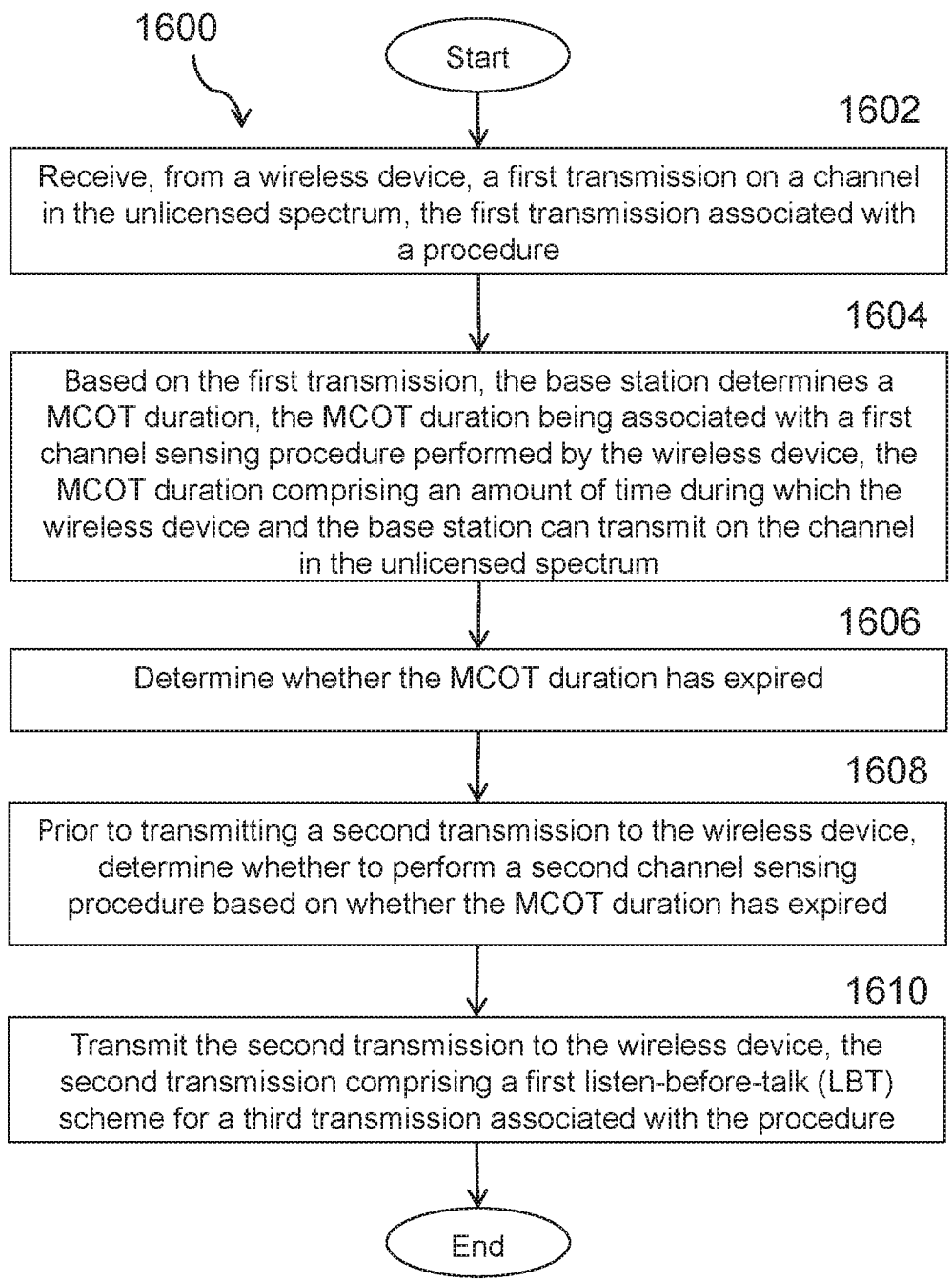
FIG. 21 illustrates another example method by a base station for enhanced channel occupancy sharing for RA and PUCCH, according to certain embodiments.

FIG. 21 depicts a method performed by a network node 160 such as, for example, a base station, for enhanced channel occupancy sharing for RA and PUCCH in an unlicensed spectrum, according to certain embodiments. At step 1602, the base station 160 receives, from a wireless device 110, a first transmission on a channel in the unlicensed spectrum. The first transmission is associated with a procedure. At step 1604, based on the first transmission, the base station 160 determines a MCOT duration. The MCOT duration is associated with a first channel sensing procedure performed by the wireless device 110 and comprises an amount of time during which the wireless device 110 and the base station 160 can transmit on the channel in the unlicensed spectrum. At step 1606, the base station 160 determines whether the MCOT duration has expired. At step 1608, prior to transmitting a second transmission to the wireless device, the base station 160 determines whether to perform a second channel sensing procedure based on whether the MCOT duration has expired. At step 1610, the base station 160 transmits the second transmission to the wireless device 110. The second transmission includes a first LBT scheme for a third transmission associated with the procedure.

In a particular embodiment, the method further includes transmitting the second transmission to the wireless device. The second transmission includes a first LBT scheme for a third transmission associated with the procedure.

In a particular embodiment, the first channel sensing procedure comprises a second LBT scheme.

In a particular embodiment, the first channel sensing procedure is associated with a LBT priority selected for the first transmission.

In a particular embodiment, the procedure is a RA procedure, the first transmission is a Msg1, and the second transmission comprises a Msg2.

In a particular embodiment, determining the MCOT duration based on the first transmission comprises determining the MCOT duration based on a PRACH preamble format or a PRACH resource used for the first transmission.

In a further particular embodiment, the MCOT duration is determined based on at least one of a numerology associated with the PRACH preamble format and a transmission duration for PRACH message transmissions.

In a particular embodiment, a shorter MCOT duration is associated with a shorter PRACH preamble format and a longer MCOT duration is associated with a longer PRACH preamble format.

In a particular embodiment, a shorter MCOT duration is associated with a higher SCS and a longer MCOT duration is associated with a lower SCS.

In a particular embodiment, the first channel sensing procedure is selected by the wireless device based on at least one of a RA purpose associated with a RA event, and QoS requirement associated with the RA event.

In a particular embodiment, the method further includes determining an updated MCOT duration and transmitting the updated MCOT duration to the wireless device.

In a particular embodiment, the updated MCOT duration is transmitted with the second transmission.

In a particular embodiment, the updated MCOT duration extends the MCOT duration by an amount of time.

In a particular embodiment, the updated MCOT duration comprises a new MCOT duration that is associated with the LBT scheme for the third transmission associated with the procedure.

In a particular embodiment, the third transmission comprises a Msg3.

In a particular embodiment, the new MCOT duration associated with the LBT scheme for the third transmission is less than the MCOT duration associated with the first channel sensing procedure.

In a particular embodiment, the method further includes, prior to receiving the first transmission, transmitting an indicator to the wireless device, the indicator indicating the first channel sensing procedure. In a further particular embodiment, the indicator is transmitted tot eh wireless device via at least one of radio resource control signaling and a MAC control element or DCI signaling.

In a particular embodiment, the first transmission comprises a PUCCH-SR transmission.

In a particular embodiment, determining whether to perform the second channel sensing procedure based on whether the MCOT duration has expired includes determining that the MCOT duration has not expired and transmitting the second transmission to the wireless device without performing the second channel sensing procedure.

In a particular embodiment, determining whether to perform the second channel sensing procedure based on whether the MCOT duration has expired comprises determining that the MCOT duration has expired, determining that the procedure has not completed, and performing the second channel sensing procedure to determine that the channel is available prior to sending the second transmission.

In a particular embodiment, the method further includes determining a level of channel occupancy of the channel and selecting at least one of the first channel sensing procedure and the second channel sensing procedure based on the level of channel occupancy.

In a particular embodiment, the method further includes obtaining a channel measurement associated with the channel and selecting at least one of the first channel sensing procedure and the second channel sensing procedure based on the channel measurement. In a further particular embodiment, the channel measurement is received from the wireless device and wherein the channel measurement comprises one or more of RSRP, RSRQ, and RSSI.

In a particular embodiment, the method further includes determining a congestion window size based on at least one of the MCOT duration or the first channel sensing procedure.

Figure 22:
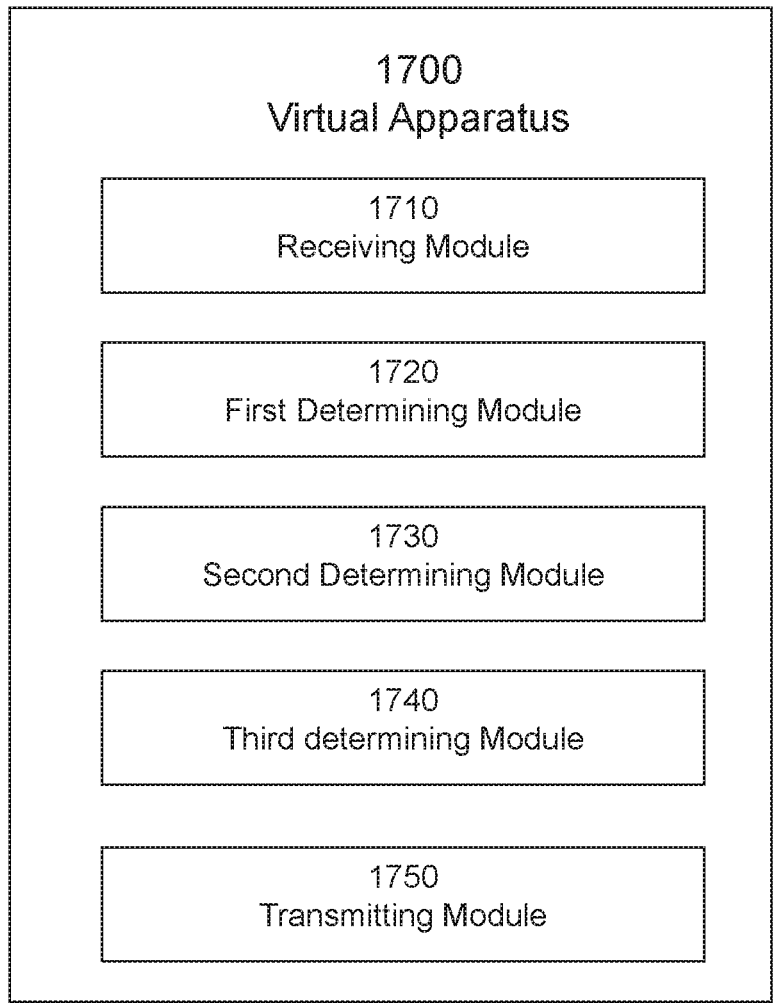
FIG. 22 illustrates another exemplary virtual computing device for enhanced channel occupancy sharing for RA and PUCCH, according to certain embodiments.

FIG. 22 illustrates a schematic block diagram of a virtual apparatus 1700 in a wireless network (for example, the wireless network shown in FIG. 4). The apparatus may be implemented in a wireless device or network node (e.g., wireless device 110 or network node 160 shown in FIG. 4). Apparatus 1700 is operable to carry out the example method described with reference to FIG. 21 and possibly any other processes or methods disclosed herein. It is also to be understood that the method of FIG. 21 is not necessarily carried out solely by apparatus 1700. At least some operations of the method can be performed by one or more other entities.

Virtual Apparatus 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc.

Program code stored in memory includes program instructions for executing one or more telecommunications and/or data communications protocols as well as instructions for carrying out one or more of the techniques described herein, in several embodiments. In some implementations, the processing circuitry may be used to cause receiving module 1710, first determining module 1720, second determining module 1730, third determining module 1740, transmitting module 1750, and any other suitable units of apparatus 1700 to perform corresponding functions according one or more embodiments of the present disclosure.

According to certain embodiments, receiving module 1710 may perform certain of the receiving functions of the apparatus 1700. For example, receiving module 1710 may receive, from a wireless device, a first transmission on a channel in the unlicensed spectrum. The first transmission is associated with a procedure.

According to certain embodiments, first determining module 1720 may perform certain of the determining functions of the apparatus 1700. For example, first determining module 1720 may determine, based on the first transmission, a MCOT duration. The MCOT duration is associated with a first channel sensing procedure performed by the wireless device and comprises an amount of time during which the wireless device and the base station can transmit on the channel in the unlicensed spectrum.

According to certain embodiments, second determining module 1730 may perform certain other of the determining functions of the apparatus 1700. For example, second determining module 1730 may determine whether the MCOT duration has expired.

According to certain embodiments, third determining module 1740 may perform certain other of the determining functions of the apparatus 1700. For example, third determining module 1740 may determine whether to perform a second channel sensing procedure based on whether the MCOT duration has expired prior to transmitting a second transmission to the wireless device.

According to certain embodiments, transmitting module 1750 may perform certain of the transmitting functions of the apparatus 1700. For example, transmitting module 1750 may transmit the second transmission to the wireless device. The second transmission includes a first LBT scheme for a third transmission associated with the procedure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

EXAMPLE EMBODIMENTS

Group A Embodiments

Embodiment 1. A method performed by a wireless device for enhanced channel occupancy sharing for random access (RA) and physical uplink control channel (PUCCH) in an unlicensed spectrum, the method comprising:
for a first transmission of a RA procedure, selecting a first channel sensing procedure for determining availability of a channel in the unlicensed spectrum;
based on the first channel sensing procedure, determining that the channel in the unlicensed spectrum is available;
in response to determining that the channel in the unlicensed spectrum is available:
determining a maximum channel occupancy time (MCOT) duration associated with the first channel sensing procedure, the MCOT duration comprising an amount of time in which the wireless device and a network node are allowed to transmit on the channel in the unlicensed spectrum for the RA procedure; and
transmitting the first transmission during the MCOT duration.

Embodiment 2. The method of Embodiment 1, wherein the first channel sensing mechanism comprises a first listen-before-talk (LBT) mechanism.

Embodiment 3. The method of Embodiment 2, wherein the first channel sensing procedure is selected based on a LBT priority selected for the first transmission.

Embodiment 4. The method of any one of Embodiments 1 to 3, wherein the first transmission is a scheduling request (Msg1).

Embodiment 5. The method of Embodiment 4, wherein the MCOT duration is selected based on a LBT priority associated with the scheduling request (Msg1).

Embodiment 6. The method of any one of Embodiments 1 to 5, further comprising:
selecting a PRACH preamble format and/or a PRACH resource for the first transmission, and
wherein the MCOT duration may be determined based on the PRACH preamble format and/or the PRACH resource, and/or
wherein the PRACH preamble format and/or PRACH resource may be used by a receiver of the first transmission to determine the MCOT duration.

Embodiment 7. The method of Embodiment 6, wherein the MCOT duration is determined based on at least one of:
a numerology associated with the PRACH preamble format, and a transmission duration for PRACH message transmissions.

Embodiment 8. The method of Embodiments 6 to 7, wherein the wireless device is configured to select a shorter MCOT duration for a shorter PRACH preamble format and a longer MCOT duration for a longer PRACH preamble format.

Embodiment 9. The method of Embodiments 6 to 7, wherein the wireless device is configured to select a shorter MCOT duration for a higher SCS and a longer MCOT duration for a shorter for a lower SCS.

Embodiment 10. The method of any one of Embodiments 1 to 9, wherein the first channel sensing procedure is selected based on at least one of: a RA purpose associated with the RA event, and a quality of service (QoS) requirement associated with the RA event.

Embodiment 11. The method of any one of Embodiments 1 to 10, further comprising:
determining that the MCOT duration has not expired, and prior to an expiration of the MCOT duration and without performing a second channel sensing procedure, transmitting a second transmission of the RA procedure during the MCOT duration.

Embodiment 12. The method of any one of Embodiments 1 to 10, further comprising:
determining a second channel sensing procedure for a second transmission, and
updating the MCOT duration based on the second channel sensing procedure for the second transmission.

Embodiment 13. The method of Embodiment 12, wherein the second channel sensing procedure is performed for a shorter duration than the first channel sensing scheme.

Embodiment 14. The method of any one of Embodiments 11 to 13, wherein the second transmission comprises a Msg3.

Embodiment 15. The method of any one of Embodiments 12 to 14, wherein updating the MCOT duration comprises changing the MCOT duration to a new MCOT duration for the second transmission.

Embodiment 16. The method of any one of Embodiments 12 to 15, wherein the second channel sensing procedure is determined based on a level of channel occupancy.

Embodiment 17. The method of any one of Embodiments 12 to 15, wherein the second channel sensing procedure is determined based on a channel measurement.

Embodiment 18. The method of any one of Embodiments 12 to 17, wherein the second channel sensing procedure for the second transmission is determined based on an indicator received from a network node in a random access response (RAR) message from a network node.

Embodiment 19. The method of any one of Embodiments 1 to 18, wherein the first channel sensing procedure is selected based on an indicator received from a network node via radio resource control signaling.

Embodiment 20. The method of any one of Embodiments 1 to 18, wherein the first channel sensing procedure is selected based on an indicator received from a network node via a MAC control element or downlink control information (DCI) signaling.

Embodiment 21. The method of any one of Embodiments 1 to 20, wherein the first transmission comprises a PUCCH-SR transmission.

Embodiment 22. The method of any one of Embodiments 1 to 21, further comprising:
  determining that the MCOT duration has expired and that the RA procedure has not complete; and
  performing a second channel sensing procedure based on a second channel sensing procedure prior to sending an additional transmission.

Embodiment 23. The method of Embodiment 22, wherein the second channel sensing procedure is selected based on an indication received from a network node.

Embodiment 24. The method of any one of Embodiments 1 to 23, wherein the first channel sensing procedure is selected based on a level of channel occupancy.

Embodiment 25. The method of any one of Embodiments 1 to 24, wherein the first channel sensing procedure is selected based on a channel measurement.

Embodiment 26. The method of Embodiment 25, wherein the channel measurement comprises one or more of RSRP, RSRQ, and RSSI.

Embodiment 27. The method of any one of Embodiments 1 to 26, further comprising determining a congestion window size based on at least one of the MCOT duration or the first channel sensing procedure.

Embodiment 28. The method of any one of Embodiments 1 to 26, further comprising detecting a RA event triggering the RA procedure, the RA procedure comprising at least the first transmission to be transmitted on a channel in the unlicensed spectrum.

Embodiment 29. The method of Embodiment 28, wherein detecting the RA event triggering the RA procedure comprises obtaining data to be transmitted in the first transmission.

Embodiment 30. The method of any one of Embodiments 1 to 29, wherein the wireless device is a user equipment (UE).

Group B Embodiments

Embodiment 31. A method performed by a base station for enhanced channel occupancy sharing for random access (RA) and physical uplink control channel (PUCCH) in an unlicensed spectrum, the method comprising:
  receiving, from a wireless device, a first transmission on a channel in the unlicensed spectrum, the first transmission associated with a RA procedure;
  based on the first transmission, determining a maximum channel occupancy time (MCOT) duration, the MCOT duration being associated with a first channel sensing procedure performed by the wireless device, the MCOT duration comprising an amount of time during which the wireless device and the base station can transmit on the channel in the unlicensed spectrum;
  determining whether the MCOT duration has expired;
  prior to transmitting a second transmission to the wireless device, determining whether to perform a second channel sensing procedure based on whether the MCOT duration has expired;
  transmitting the second transmission to the wireless device.

Embodiment 32. The method of Embodiment 31, wherein the first channel sensing mechanism comprises a first listen-before-talk (LBT) mechanism.

Embodiment 33. The method of Embodiment 32, wherein the first channel sensing procedure is associated with a LBT priority selected for the first transmission.

Embodiment 34. The method of any one of Embodiments 31 to 33, wherein the first transmission is a scheduling request (Msg1).

Embodiment 35. The method of Embodiment 34, wherein the MCOT duration is based on a LBT priority associated with the scheduling request (Msg1).

Embodiment 36. The method of any one of Embodiments 31 to 35, wherein determining the MCOT duration based on the first transmission comprises determining the MCOT duration based on a PRACH preamble format or a PRACH resource used for the first transmission.

Embodiment 37. The method of Embodiment 36, wherein the MCOT duration is determined based on at least one of:
  a numerology associated with the PRACH preamble format, and
  a transmission duration for PRACH message transmissions.

Embodiment 38. The method of Embodiments 36 to 37, wherein a shorter MCOT duration is associated with a shorter PRACH preamble format and/or a longer MCOT duration is associated with a longer PRACH preamble format.

Embodiment 39. The method of Embodiments 36 to 37, wherein a shorter MCOT duration is associated with a higher SCS and/or a longer MCOT duration is associated with a lower SCS.

Embodiment 40. The method of any one of Embodiments 31 to 39, wherein the first channel sensing procedure is selected by the wireless device based on at least one of:
  a RA purpose associated with the RA event, and
  a quality of service (QoS) requirement associated with the RA event.

Embodiment 41. The method of any one of Embodiments 31 to 40, further comprising:
  determining an updated MCOT duration; and
  transmitting the updated MCOT duration to the wireless device.

Embodiment 42. The method of Embodiment 41, wherein the updated MCOT duration is transmitted with the second transmission.

Embodiment 43. The method of any one of Embodiments 41 to 42, wherein the updated MCOT duration extends the MCOT duration by an amount of time.

Embodiment 44. The method of any one of Embodiments 41 to 42, wherein the updated MCOT duration comprises a new MCOT duration that is associated with a second channel sensing procedure to be performed by the wireless device for an additional transmission associated with the RA procedure.

Embodiment 45. The method of Embodiment 44, wherein the additional transmission comprises a Msg3.

Embodiment 46. The method of Embodiment 44, wherein the updated MCOT duration associated with the second channel sensing procedure is less than the MCOT duration associated with the first channel sensing procedure.

Embodiment 47. The method of any one of Embodiments 41 to 46, wherein the updated MCOT duration is determined based on a level of channel occupancy.

Embodiment 48. The method of any one of Embodiments 41 to 47, wherein the updated MCOT duration is determined based on a channel measurement.

Embodiment 49. The method of any one of Embodiments 39 to 48, wherein the second transmission comprises a Msg2 and/or a random access response (RAR).

Embodiment 50. The method of any one of Embodiments 39 to 49, further comprising, prior to receiving the first transmission, transmitting an indicator to the wireless device, the indicator indicating the first channel sensing procedure.

Embodiment 51. The method of Embodiment 50, wherein the indicator is transmitted tot eh wireless device via at least one of:—radio resource control signaling; a MAC control element or downlink control information (DCI) signaling.

Embodiment 52. The method of any one of Embodiments 39 to 51, wherein the first transmission comprises a PUCCH-SR transmission.

Embodiment 53. The method of any one of Embodiments 39 to 52, wherein determining whether to perform the second channel sensing procedure based on whether the MCOT duration has expired comprises:
determining that the MCOT duration has not expired;
transmitting the second transmission to the wireless device without performing the second channel sensing procedure.

Embodiment 54. The method of any one of Embodiments 39 to 52, wherein determining whether to perform the second channel sensing procedure based on whether the MCOT duration has expired comprises:
determining that the MCOT duration has expired;
determining that the RA procedure has not completed; and
performing the second channel sensing procedure to determine that the channel is available prior to sending the second transmission.

Embodiment 55. The method of any one of Embodiments 39 to 54, further comprising:
determining a level of channel occupancy of the channel; and
selecting the first channel sensing procedure and/or the second channel sensing procedure based on the level of channel occupancy.

Embodiment 56. The method of any one of Embodiments 39 to 55, further comprising:
obtaining a channel measurement associated with the channel; and
selecting the first channel sensing procedure and/or the second channel sensing procedure based on the channel measurement.

Embodiment 57. The method of Embodiment 56, wherein the channel measurement is received from the wireless device.

Embodiment 58. The method of any one of Embodiments 56 to 57, wherein the channel measurement comprises one or more of RSRP, RSRQ, and RSSI.

Embodiment 59. The method of any one of Embodiments 31 to 58, further comprising determining a congestion window size based on at least one of the MCOT duration or the first channel sensing procedure.

Group C Embodiments

Embodiment 60. A wireless device for improving network efficiency, the wireless device comprising:
processing circuitry configured to perform any of the steps of any of the Group A embodiments; and
power supply circuitry configured to supply power to the wireless device.

Embodiment 61. A base station for improving network efficiency, the base station comprising:
processing circuitry configured to perform any of the steps of any of the Group B embodiments;
power supply circuitry configured to supply power to the wireless device.

Embodiment 62. A user equipment (UE) for improving network efficiency, the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

Embodiment 63. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the Group B embodiments.

Embodiment 64. The communication system of the pervious embodiment further including the base station.

Embodiment 65. The communication system of the previous 2 embodiments, further including the UE, wherein the UE is configured to communicate with the base station.

Embodiment 66. The communication system of the previous 3 embodiments, wherein:
the processing circuitry of the host computer is configured to execute a host application, thereby providing the user data; and
the UE comprises processing circuitry configured to execute a client application associated with the host application.

Embodiment 67. A method implemented in a communication system including a host computer, a base station and a user equipment (UE), the method comprising:
 at the host computer, providing user data; and
 at the host computer, initiating a transmission carrying the user data to the UE via a cellular network comprising the base station, wherein the base station performs any of the steps of any of the Group B embodiments.

Embodiment 68. The method of the previous embodiment, further comprising, at the base station, transmitting the user data.

Embodiment 69. The method of the previous 2 embodiments, wherein the user data is provided at the host computer by executing a host application, the method further comprising, at the UE, executing a client application associated with the host application.

Embodiment 70. A user equipment (UE) configured to communicate with a base station, the UE comprising a radio interface and processing circuitry configured to performs the of the previous 3 embodiments.

Embodiment 71. A communication system including a host computer comprising:
 processing circuitry configured to provide user data; and
 a communication interface configured to forward user data to a cellular network for transmission to a user equipment (UE),
 wherein the UE comprises a radio interface and processing circuitry, the UE's components configured to perform any of the steps of any of the Group A embodiments.

Embodiment 72. The communication system of the previous embodiment, wherein the cellular network further includes a base station configured to communicate with the UE.

Embodiment 73. The communication system of the previous 2 embodiments, wherein:
 the processing circuitry of the host computer is configured to execute a host application, thereby providing the user data; and
 the UE's processing circuitry is configured to execute a client application associated with the host application.

Embodiment 74. A method implemented in a communication system including a host computer, a base station and a user equipment (UE), the method comprising:
 at the host computer, providing user data; and
 at the host computer, initiating a transmission carrying the user data to the UE via a cellular network comprising the base station, wherein the UE performs any of the steps of any of the Group A embodiments.

Embodiment 75. The method of the previous embodiment, further comprising at the UE, receiving the user data from the base station.

Embodiment 76. A communication system including a host computer comprising: communication interface configured to receive user data originating from a transmission from a user equipment (UE) to a base station,
 wherein the UE comprises a radio interface and processing circuitry, the UE's processing circuitry configured to perform any of the steps of any of the Group A embodiments.

Embodiment 77. The communication system of the previous embodiment, further including the UE.

Embodiment 78. The communication system of the previous 2 embodiments, further including the base station, wherein the base station comprises a radio interface configured to communicate with the UE and a communication interface configured to forward to the host computer the user data carried by a transmission from the UE to the base station.

Embodiment 79. The communication system of the previous 3 embodiments, wherein:
 the processing circuitry of the host computer is configured to execute a host application; and
 the UE's processing circuitry is configured to execute a client application associated with the host application, thereby providing the user data.

Embodiment 80. The communication system of the previous 4 embodiments, wherein:
 the processing circuitry of the host computer is configured to execute a host application, thereby providing request data; and
 the UE's processing circuitry is configured to execute a client application associated with the host application, thereby providing the user data in response to the request data.

Embodiment 81. A method implemented in a communication system including a host computer, a base station and a user equipment (UE), the method comprising:
 at the host computer, receiving user data transmitted to the base station from the UE, wherein the UE performs any of the steps of any of the Group A embodiments.

Embodiment 82. The method of the previous embodiment, further comprising, at the UE, providing the user data to the base station.

Embodiment 83. The method of the previous 2 embodiments, further comprising:
 at the UE, executing a client application, thereby providing the user data to be transmitted; and
 at the host computer, executing a host application associated with the client application.

Embodiment 84. The method of the previous 3 embodiments, further comprising:
 at the UE, executing a client application; and
 at the UE, receiving input data to the client application, the input data being provided at the host computer by executing a host application associated with the client application,
 wherein the user data to be transmitted is provided by the client application in response to the input data.

Embodiment 85. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

Embodiment 86. The communication system of the previous embodiment further including the base station.

Embodiment 87. The communication system of the previous 2 embodiments, further including the UE, wherein the UE is configured to communicate with the base station.

Embodiment 88. The communication system of the previous 3 embodiments, wherein:
 the processing circuitry of the host computer is configured to execute a host application;
 the UE is configured to execute a client application associated with the host application, thereby providing the user data to be received by the host computer.

Embodiment 89. A method implemented in a communication system including a host computer, a base station and a user equipment (UE), the method comprising:
 at the host computer, receiving, from the base station, user data originating from a transmission which the base station has received from the UE, wherein the UE performs any of the steps of any of the Group A embodiments.

Embodiment 90. The method of the previous embodiment, further comprising at the base station, receiving the user data from the UE.

Embodiment 91. The method of the previous 2 embodiments, further comprising at the base station, initiating a transmission of the received user data to the host computer.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

- 1×RTT CDMA2000 1× Radio Transmission Technology
- 3GPP 3rd Generation Partnership Project
- 5G 5th Generation
- 5GS 5G System
- 5QI 5G QoS Identifier
- ABS Almost Blank Subframe
- AN Access Network
- AN Access Node
- ARQ Automatic Repeat Request
- AS Access Stratum
- AWGN Additive White Gaussian Noise
- BCCH Broadcast Control Channel
- BCH Broadcast Channel
- CA Carrier Aggregation
- CC Carrier Component
- CCCH SDU Common Control Channel SDU
- CDMA Code Division Multiplexing Access
- CGI Cell Global Identifier
- CIR Channel Impulse Response
- CN Core Network
- CP Cyclic Prefix
- CPICH Common Pilot Channel
- CPICH Ec/No CPICH Received energy per chip divided by the power density in the band
- CQI Channel Quality information
- C-RNTI Cell RNTI
- CSI Channel State Information
- DCCH Dedicated Control Channel
- DL Downlink
- DM Demodulation
- DMRS Demodulation Reference Signal
- DRX Discontinuous Reception
- DTX Discontinuous Transmission
- DTCH Dedicated Traffic Channel
- DUT Device Under Test
- E-CID Enhanced Cell-ID (positioning method)
- E-SMLC Evolved-Serving Mobile Location Centre
- ECGI Evolved CGI
- eMBB Enhanced Mobile BroadBand
- eNB E-UTRAN NodeB
- ePDCCH enhanced Physical Downlink Control Channel
- EPS Evolved Packet System
- E-SMLC evolved Serving Mobile Location Center
- E-UTRA Evolved UTRA
- E-UTRAN Evolved Universal Terrestrial Radio Access Network
- FDD Frequency Division Duplex
- FFS For Further Study
- GERAN GSM EDGE Radio Access Network
- gNB gNode B (a base station in NR; a Node B supporting NR and connectivity to NGC)
- GNSS Global Navigation Satellite System
- GSM Global System for Mobile communication
- HARQ Hybrid Automatic Repeat Request
- HO Handover
- HSPA High Speed Packet Access
- HRPD High Rate Packet Data
- LOS Line of Sight
- LPP LTE Positioning Protocol
- LTE Long-Term Evolution
- MAC Medium Access Control
- MBMS Multimedia Broadcast Multicast Services
- MBSFN Multimedia Broadcast multicast service Single Frequency Network
- MBSFN ABS MBSFN Almost Blank Subframe
- MDT Minimization of Drive Tests
- MIB Master Information Block
- MME Mobility Management Entity
- MSC Mobile Switching Center
- NGC Next Generation Core
- NPDCCH Narrowband Physical Downlink Control Channel
- NR New Radio
- OCNG OFDMA Channel Noise Generator
- OFDM Orthogonal Frequency Division Multiplexing
- OFDMA Orthogonal Frequency Division Multiple Access
- OSS Operations Support System
- OTDOA Observed Time Difference of Arrival
- O&M Operation and Maintenance
- PBCH Physical Broadcast Channel
- P-CCPCH Primary Common Control Physical Channel
- PCell Primary Cell
- PCFICH Physical Control Format Indicator Channel
- PDCCH Physical Downlink Control Channel
- PDP Profile Delay Profile
- PDSCH Physical Downlink Shared Channel
- PGW Packet Gateway
- PHICH Physical Hybrid-ARQ Indicator Channel
- PLMN Public Land Mobile Network
- PMI Precoder Matrix Indicator
- PRACH Physical Random Access Channel
- PRS Positioning Reference Signal
- PS Packet Switched
- PSS Primary Synchronization Signal
- PUCCH Physical Uplink Control Channel
- PUSCH Physical Uplink Shared Channel
- RACH Random Access Channel
- QAM Quadrature Amplitude Modulation
- RAB Radio Access Bearer
- RAN Radio Access Network
- RANAP Radio Access Network Application Part
- RAT Radio Access Technology
- RLM Radio Link Management
- RNC Radio Network Controller
- RNTI Radio Network Temporary Identifier
- RRC Radio Resource Control
- RRM Radio Resource Management
- RS Reference Signal
- RSCP Received Signal Code Power
- RSRP Reference Symbol Received Power OR Reference Signal Received Power
- RSRQ Reference Signal Received Quality OR Reference Symbol Received Quality
- RSSI Received Signal Strength Indicator
- RSTD Reference Signal Time Difference
- RWR Release with Redirect
- SCH Synchronization Channel
- SCell Secondary Cell
- SCS Subcarrier Spacing
- SDU Service Data Unit SFN System Frame Number
SGW Serving Gateway
SI System Information
SIB System Information Block
SNR Signal to Noise Ratio
S-NSSAI Single Network Slice Selection Assistance Information
SON Self Optimized Network
SS Synchronization Signal
SSS Secondary Synchronization Signal
TBS Transport Block Size
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

The invention claimed is:

1. A method performed by a wireless device for enhanced channel occupancy sharing for random access, RA, and physical uplink control channel, PUCCH, in an unlicensed spectrum, the method comprising:
for a first transmission of a procedure, selecting a first channel sensing procedure for determining availability of a channel in the unlicensed spectrum;
based on the first channel sensing procedure, determining that the channel in the unlicensed spectrum is available;
in response to determining that the channel in the unlicensed spectrum is available:
determining a maximum channel occupancy time, MCOT, duration associated with the first channel sensing procedure, the MCOT duration comprising an amount of time in which the wireless device and a network node are allowed to transmit on the channel in the unlicensed spectrum for the procedure;
transmitting the first transmission during the MCOT duration;
receiving a second transmission from the network node, the second transmission comprising a first listen-before-talk, LBT, scheme for a third transmission associated with the procedure;
determining a second channel sensing procedure for a second transmission; and
updating the MCOT duration based on the second channel sensing procedure for the third transmission.

2. The method of claim 1, wherein the first channel sensing procedure comprises a second LBT scheme.

3. The method of claim 1, wherein the first channel sensing procedure is selected based on a LBT priority selected for the first transmission.

4. The method of claim 1, wherein the procedure is RA procedure, the first transmission is a Msg1, and the second transmission comprises a Msg2.

5. The method of claim 1, further comprising:
selecting at least one of a physical random access channel, PRACH, preamble format and a PRACH resource for the first transmission, and
wherein the MCOT duration may be determined based on at least one of the PRACH preamble format and the PRACH resource, and
wherein the PRACH preamble format or PRACH resource may be used by a receiver of the first transmission to determine the MCOT duration.

6. The method of claim 5, wherein the MCOT duration is determined based on at least one of:
a numerology associated with the PRACH preamble format, and
a transmission duration for PRACH message transmissions.

7. The method of claim 5, wherein the wireless device is configured to select a shorter MCOT duration for a shorter PRACH preamble format and a longer MCOT duration for a longer PRACH preamble format.

8. The method of claim 5, wherein the wireless device is configured to select a shorter MCOT duration for a higher subcarrier spacing, SCS, and a longer MCOT duration for a shorter for a lower SCS.

9. The method of claim 1, wherein the first channel sensing procedure is selected based on at least one of:
a RA purpose associated with an RA event, and
a quality of service, QoS, requirement associated with the RA event.

10. The method of claim 1, further comprising:
determining that the MCOT duration has not expired, and prior to an expiration of the MCOT duration and without performing a second channel sensing procedure, transmitting the third transmission of the procedure during the MCOT duration.

11. The method of claim 1, wherein the second channel sensing procedure is performed for a shorter duration than the first channel sensing procedure.

12. The method of claim 1, wherein the third transmission comprises a Msg3.

13. The method of claim 1, wherein updating the MCOT duration comprises changing the MCOT duration to a new MCOT duration associated with the LBT scheme for the third transmission associated with the procedure.

14. The method of claim 1, wherein the second channel sensing procedure for the third transmission is determined based on an indicator received from a network node in the second transmission, the second transmission comprising a random access response, RAR, message from the network node.

15. The method of claim 1, wherein the first channel sensing procedure is selected based on an indicator received from the network node, the indicator received via radio resource control signaling, a MAC control element, or downlink control information, DCI, signaling.

16. The method of claim 1, wherein the procedure is a transmission procedure on PUCCH and the first transmission comprises a PUCCH-SR transmission.

17. The method of claim 1, further comprising:
determining that the MCOT duration has expired and that the procedure has not completed; and
performing a second channel sensing procedure prior to sending the third transmission.

18. The method of claim 17, wherein the second channel sensing procedure is selected based on an indication received from the network node.

19. A method performed by a base station for enhanced channel occupancy sharing for random access, RA, and physical uplink control channel, PUCCH, in an unlicensed spectrum, the method comprising:
receiving, from a wireless device, a first transmission on a channel in the unlicensed spectrum, the first transmission associated with a procedure;
based on the first transmission, determining a maximum channel occupancy time, MCOT, duration, the MCOT duration being associated with a first channel sensing procedure performed by the wireless device, the MCOT duration comprising an amount of time during which the wireless device and the base station can transmit on the channel in the unlicensed spectrum;
determining if the MCOT duration has expired;
prior to transmitting a second transmission to the wireless device, determining to perform a second channel sensing procedure based on the determination regarding the MCOT duration's expiration;
transmitting the second transmission to the wireless device, the second transmission comprising first a listen-before-talk, LBT, scheme for a third transmission associated with the procedure.

20. A wireless device for enhanced channel occupancy sharing for random access, RA, and physical uplink control channel, PUCCH, in an unlicensed spectrum, the wireless device comprising:
processing circuitry configured to:
for a first transmission of a procedure, select a first channel sensing procedure for determining availability of a channel in the unlicensed spectrum;
based on the first channel sensing procedure, determine that the channel in the unlicensed spectrum is available;
in response to determining that the channel in the unlicensed spectrum is available;
determine a maximum channel occupancy time, MCOT, duration associated with the first channel sensing procedure, the MCOT duration comprising an amount of time in which the wireless device and a network node are allowed to transmit on the channel in the unlicensed spectrum for the procedure;
transmit the first transmission during the MCOT duration;
receive a second transmission from the network node, the second transmission comprising a first listen-before-talk, LBT, scheme for a third transmission associated with the procedure;
determine a second channel sensing procedure for a second transmission; and
update the MCOT duration based on the second channel sensing procedure for the third transmission.

21. A base station for enhanced channel occupancy sharing for random access, RA, and physical uplink control channel, PUCCH in an unlicensed spectrum, the base station comprising:
processing circuitry configured to:
receive, from a wireless device, a first transmission on a channel in the unlicensed spectrum, the first transmission associated with a procedure;
based on the first transmission, determine a maximum channel occupancy time, MCOT, duration, the MCOT duration being associated with a first channel sensing procedure performed by the wireless device, the MCOT duration comprising an amount of time during which the wireless device and the base station can transmit on the channel in the unlicensed spectrum;
determine if the MCOT duration has expired;
prior to transmitting a second transmission to the wireless device, determine to perform a second channel sensing procedure based on the determination regarding the MCOT duration's expiration;
transmit the second transmission to the wireless device, the second transmission comprising a first listen-before-talk, LBT, scheme for a third transmission associated with the procedure.

* * * * *